United States Patent [19]

Akagi et al.

[11] Patent Number: 5,235,458
[45] Date of Patent: Aug. 10, 1993

[54] BINOCULAR

[75] Inventors: Katsuhito Akagi; Kazuo Kimura; Haruyuki Nagano; Makoto Kamiya; Masatoshi Yoneyama, all of Sakai; Iwao Ishida, Izumi; Koichi Okumura, Sakai, all of Japan

[73] Assignee: Minolta Camera Kabushiki Kaisha, Osaka, Japan

[21] Appl. No.: 656,821

[22] Filed: Feb. 19, 1991

[30] Foreign Application Priority Data

| Feb. 20, 1990 | [JP] | Japan | 2-040275 |
| Feb. 21, 1990 | [JP] | Japan | 2-41804 |
| Mar. 5, 1990 | [JP] | Japan | 2-54691 |
| Sep. 7, 1990 | [JP] | Japan | 2-238501 |

[51] Int. Cl.$^5$ .............................. G02B 23/06
[52] U.S. Cl. ............................ 359/410; 359/416; 359/419; 250/201.2; 354/402
[58] Field of Search ............ 359/410, 414, 416, 417, 359/418, 419; 250/29.2; 354/402, 408

[56] References Cited

U.S. PATENT DOCUMENTS

| 4,186,992 | 2/1980 | Kamakura | 359/416 |
| 4,262,988 | 4/1981 | Ishibai et al. | 359/418 |
| 4,436,386 | 3/1984 | Ishibai et al. | 359/417 |
| 4,488,037 | 12/1984 | Ishibai et al. | 250/201.2 |
| 4,650,297 | 3/1987 | Ishibai et al. | 359/418 |
| 4,886,347 | 12/1989 | Monroe | 359/413 |
| 4,998,357 | 3/1991 | Farnung et al. | |
| 5,062,698 | 11/1991 | Funathu | 359/418 |
| 5,064,279 | 11/1991 | Riedl | 359/416 |

Primary Examiner—Carolyn E. Fields
Assistant Examiner—Drew A. Dunn
Attorney, Agent, or Firm—Burns, Doane, Swecker & Mathis

[57] ABSTRACT

A binocular comprising a housing and a pair of first and second optical systems positioned on each side of a central line. Each optical system includes an object lens and ocular lens arranged at a front part and at a rear part of the housing respectively. Further, a light admitting window is placed on the central line between the first and second optical systems for admitting light from an object. A detection module, provided independently of the first and second optical systems is used to output electrical signals which represent the distance to the object. The detection module may include an optical path deflecting means for z-shapely deflecting the light from the light admitting window and for directing the light to a sensor. The binocular is compact and has a hand grip that is designed in order to be holdable and focusable by the use of a single hand.

29 Claims, 23 Drawing Sheets

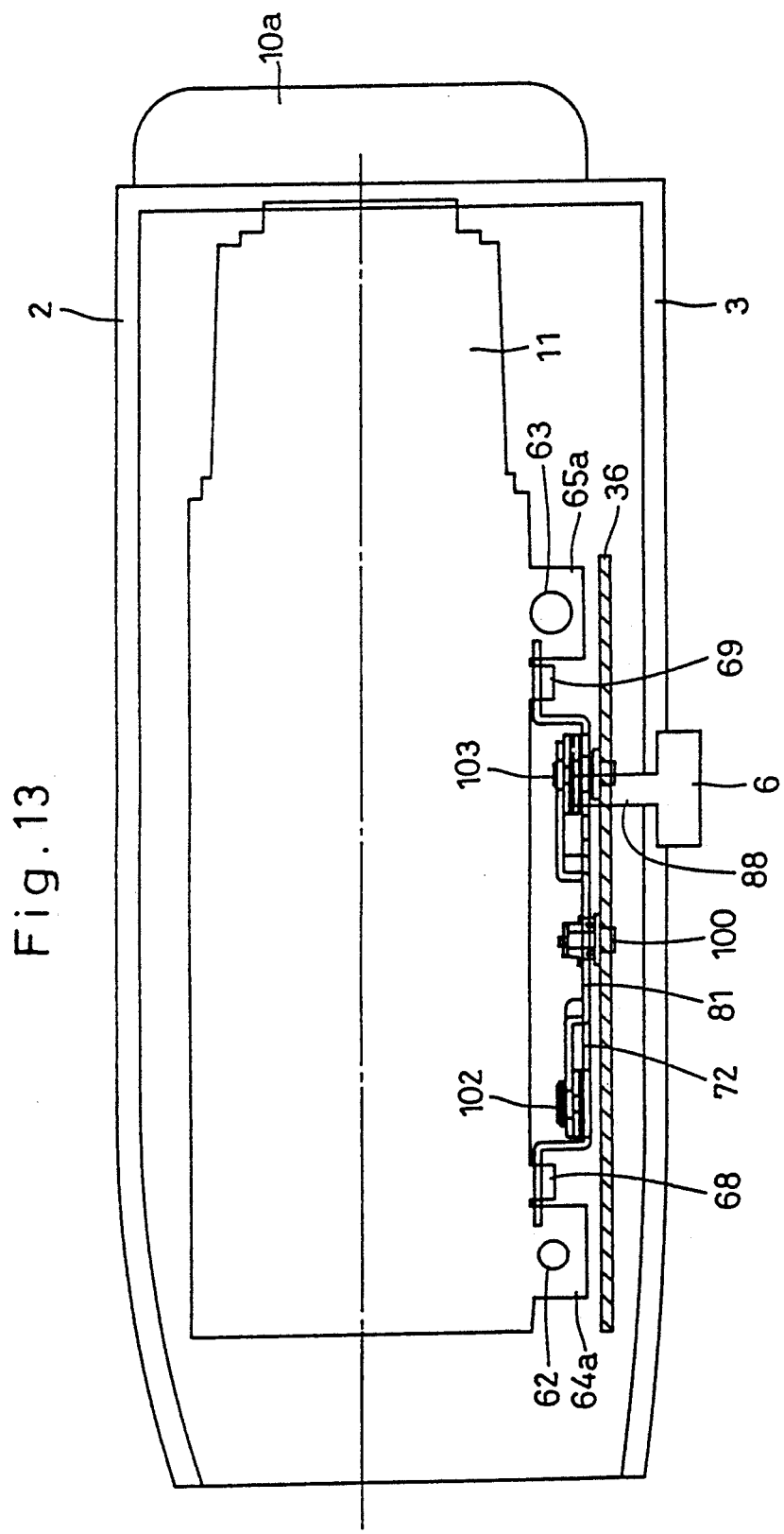

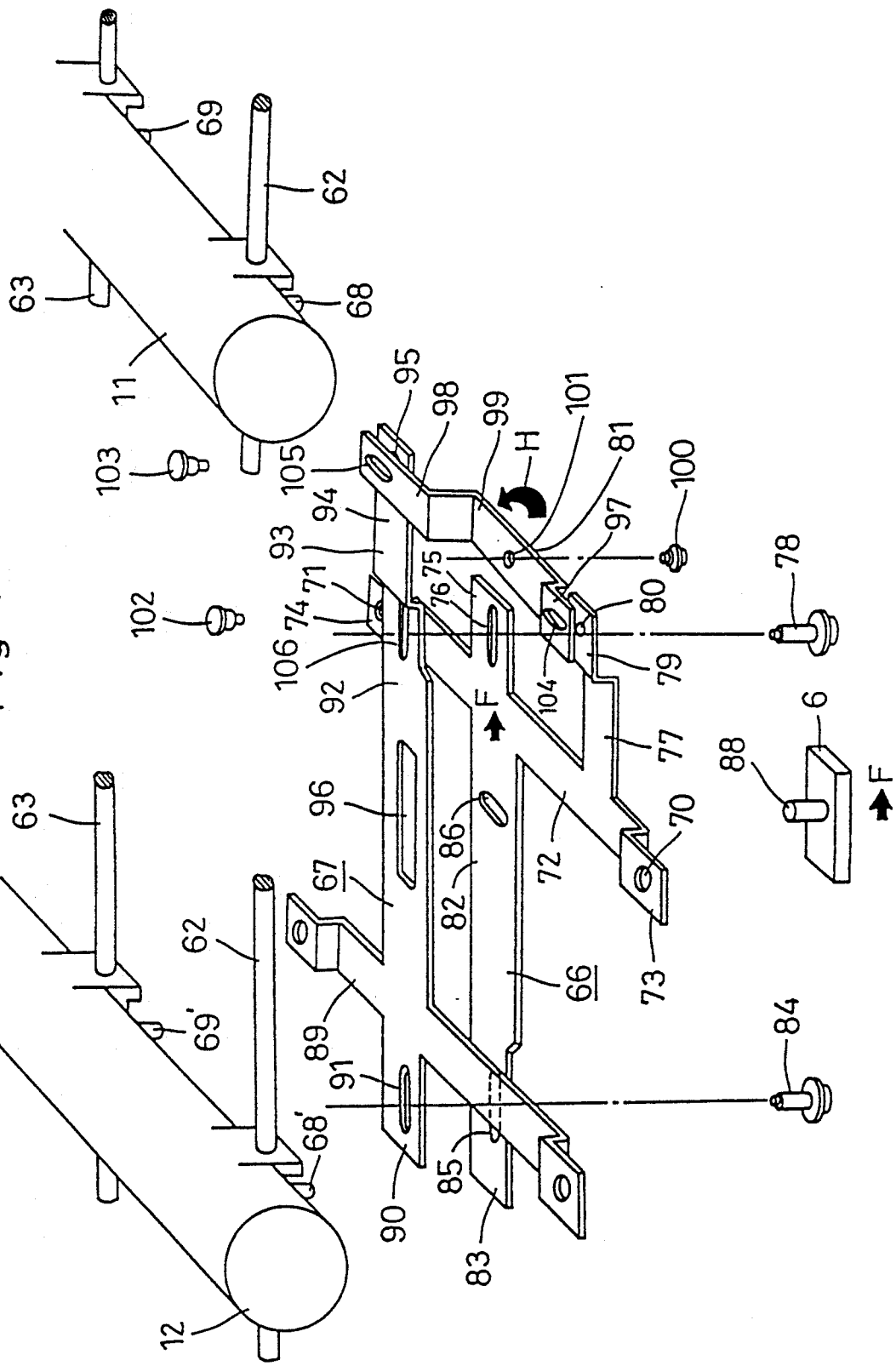

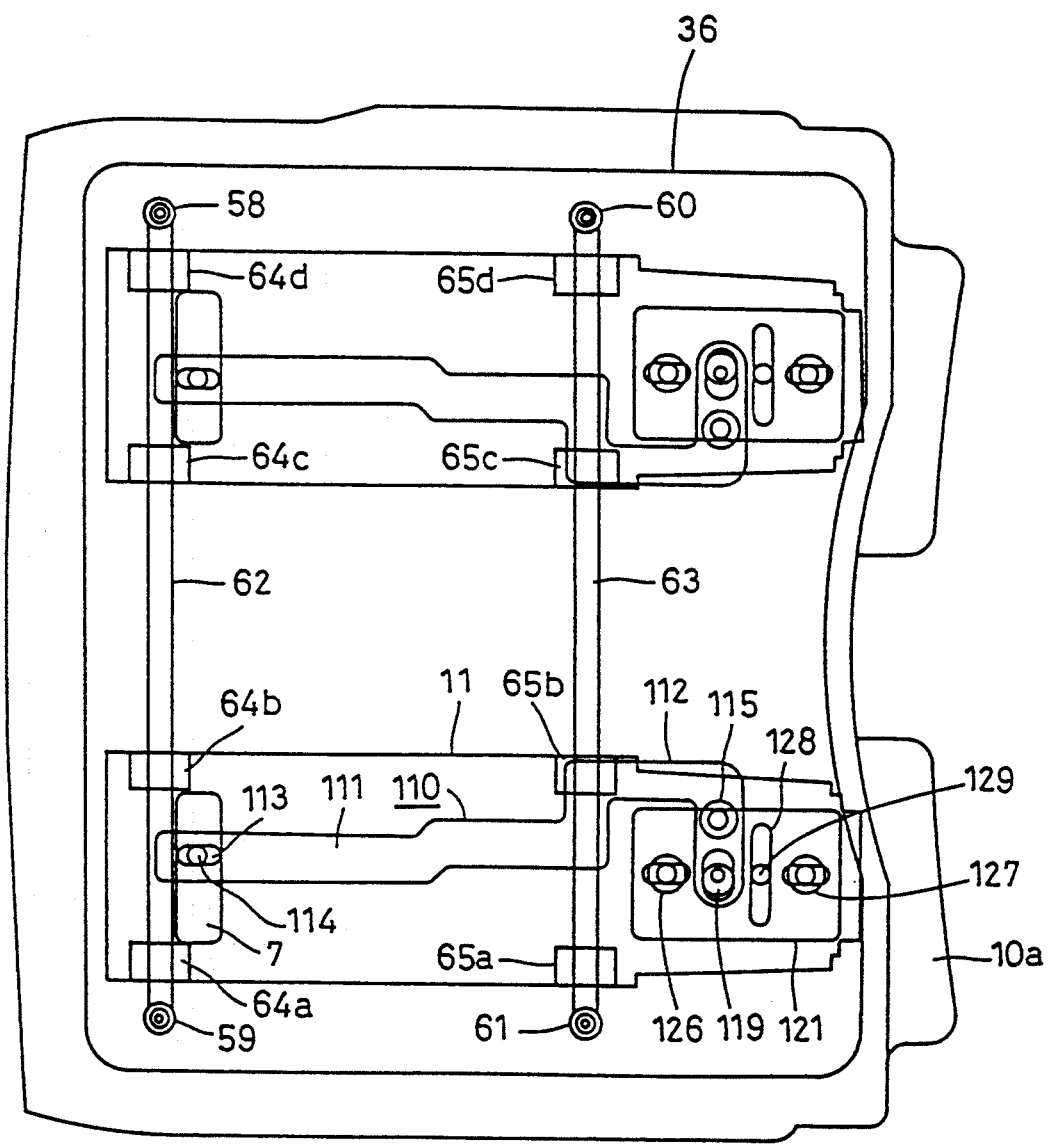

BINOCULAR

BACKGROUND OF THE INVENTION

The present invention relates to a binocular. More particularly, the invention relates to a binocular with automatic focusing function.

Such binoculars with automatic focusing function have been proposed in Japanese published Patent Application No. S62-6205, Japanese published Patent Application No. S60-46407 and Japanese laid-open Patent Application No. S56-154705. In the binoculars disclosed in these prior art references, an object distance detection module is provided between a pair of object lenses positioned on both sides of the binocular, and a pair of light admitting windows for receiving light from an object and for sending it to the module is arranged at the outside of the object lens.

For this structure, the optical path arrangement for leading light from the light admitting window to the module is complicated, and the entire body cannot be made compact since the light admitting window is arranged at the outside of object lens.

In the above prior art, two light admitting windows are provided since they are required at the outsides of a pair of object lens. If the body is made compact by removing one of the light admitting windows, a problem arises in that the focus detection area changes according to the distance from an object as shown in FIG. 1A. That is, when the light sensing unit of focus sensor SA is arranged at the outside of one object lens OL as shown in FIG. 1A, though the focus detection area is A1' in FIG. 1B when the image scene is at A1, it is shifted to A2' in FIG. 1B when the image scene is at A2.

Further, the binocular according to the above prior art is disadvantageous in their great thickness (especially, at side edges) and their inferior external shapes since the occupation length from top to bottom of the light admitting window is greater than that of the object lenses.

SUMMARY OF THE INVENTION

An object of the present invention is to provide a compact binocular with an excellent external shape whose focus detetion area does not change according to the distance from an object.

Another object of the present invention is to provide a binocular in which the shake caused by the clearance in the path of an object lens driving mechanism, an pupil distance (or inter-ocular distance) adjusting mechanism or a dioptric power adjusting mechanism is prevented.

A further object of the present invention is to provide a binocular whose battery cavity forms a grip for holding the binocular.

According to one feature of the present invention, a binocular comprises: a housing; a pair of first and second optical systems positioned on both sides of said housing and including an object lens and an ocular arranged at a front part and at a rear part of said housing, respectively; a light admitting window arranged between said first and second optical systems; and a detection module for receiving light from an object which passes through said light admitting window and for outputting a signal which represents the distance to the object.

According to another feature of the present invention, a binocular comprises: a pair of optical systems including a first and second optical systems both of which are movable; a detection means for detecting information of the distance to an object; a calculation means for generating an electric signal to drive said optical system to the focusing position according to the output from said detection means; a motor driven by the output of said calculation means; a driving force transmitting means including a junction on the transmission path of the driving force from said motor to said optical system, where said junction has a clearance; and a pushing means for pushing said path in one direction so that there is no clearance on one side on the path at said junction.

According to another feature of the present invention, a binocular comprises: a first and a second optical systems positioned on both sides and including an object lens and an ocular, respectively; a battery cavity arranged at a lower part of either of said first and second optical systems along a direction parallel to the optical axis of the optical system; and a housing where said battery cavity protrudes from the body and works as a grip.

BRIEF DESCRIPTION OF THE ATTACHED DRAWINGS

These and other objects and features of this invention will become clear from the following description taken in conjunction with the preferred embodiments with reference to the accompanied drawings in which:

FIG. 13 is a cross-sectional view of the pupil distance adjusting mechanism.

FIG. 14 is a broken perspective view of the pupil distance adjusting mechanism.

FIG. 15 is a plan view of the dioptric power adjusting mechanism of the binocular.

DETAILED DESCRIPTION OF THE PREFERRED EMBODIMENT

Figure 1A:
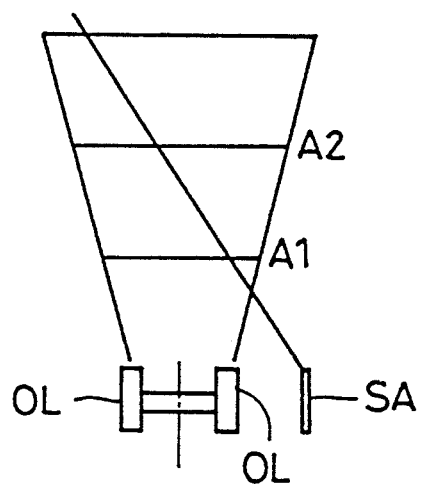
FIGS. 1A and 1B are explanatory diagrams for a prior art device.
Figure 1B:
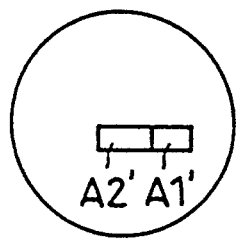
Figure 2A:
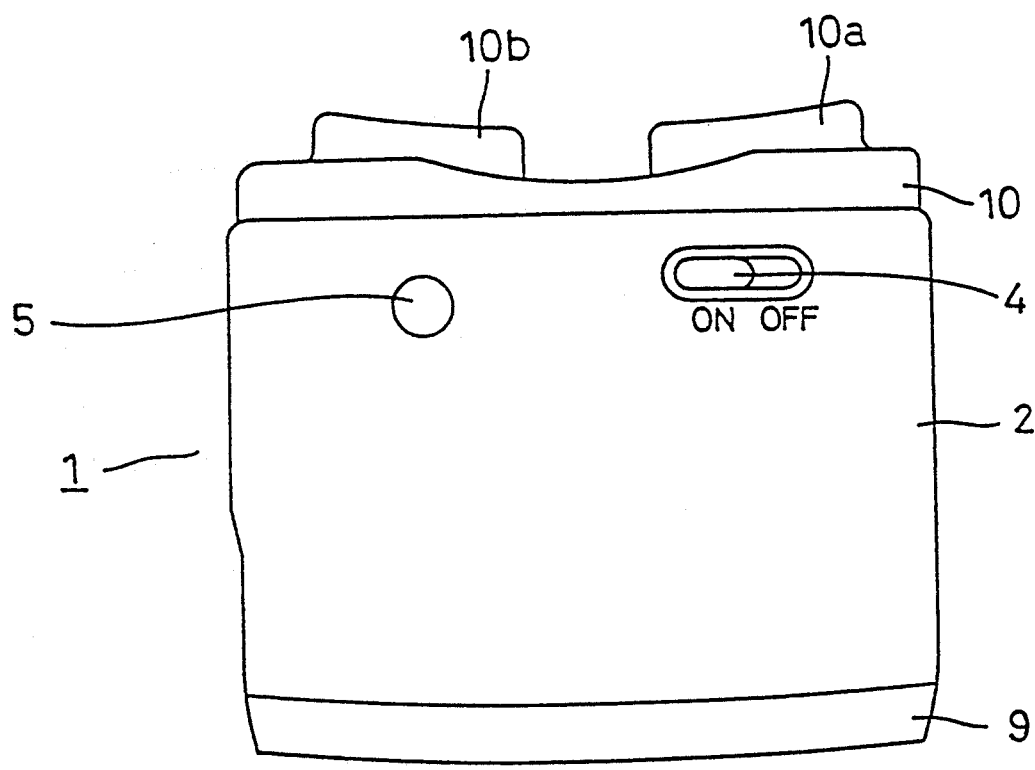
FIGS. 2A, 2B and 2C are an upper plan view, a front view and a bottom view, respectively, of a binocular embodying the present invention.
Figure 2B:
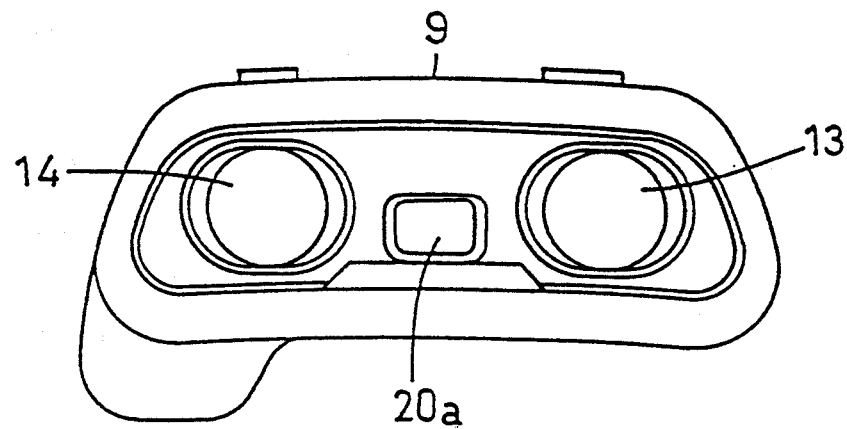
Figure 2C:
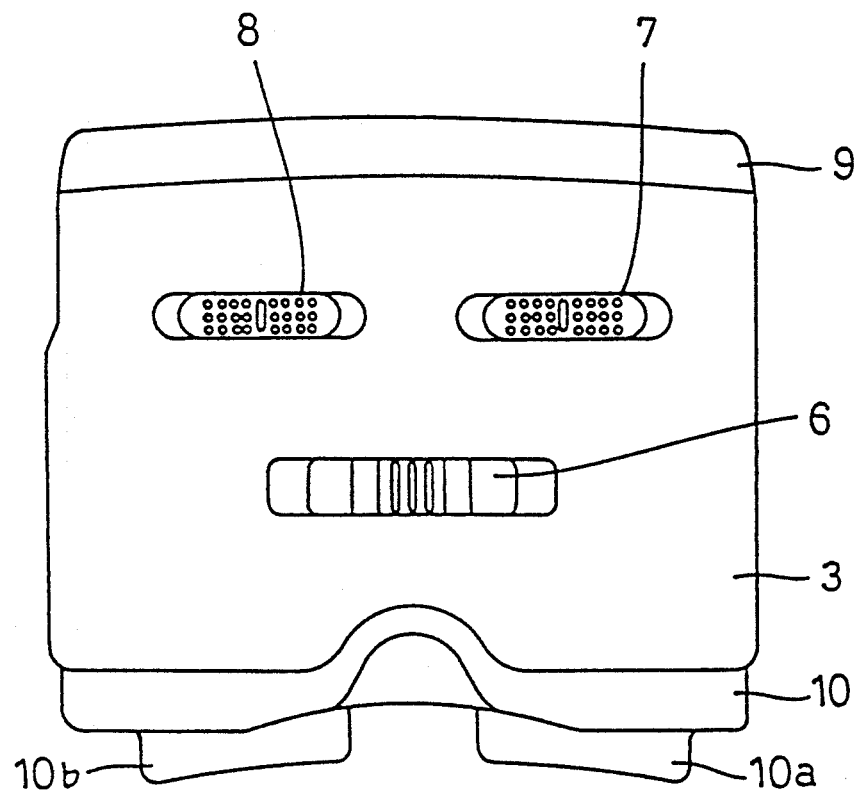

The present invention is embodied in a binocular as shown in FIGS. 2A-2C, where FIG. 2A is the upper plan view, FIG. 2B is the front view, and FIG. 2C is the bottom view. The housing of the binocular 1 is composed of an upper cover 2, a lower cover 3, a front cover 9 and a rear cover 10.

The upper and lower covers 2 and 3 as well as the front and rear covers 9 and 10 are made of plastic. On the upper cover 2 are provided a slidable operation member of a main switch (hereinafter referred to "first operation member") 4 and a push button member (hereinafter referred to "second operation member") 5: the main switch activated by the first operation member 4 is the switch of the binocular 1 for turning on or off the power supply to the whole system of the binocular 1, and a switch activated by the second operation member 5 is an auto-focusing (AF) switch. On the lower cover 3 are provided three slidable operation members (hereinafter referred to "third operation member", "fourth operation member" and "fifth operation member") 6, 7 and 8: the third operation member 6 is for altering the pupil distance, and the fourth and fifth members 7 and 8 are for adjusting the dioptric power.

Figure 3:
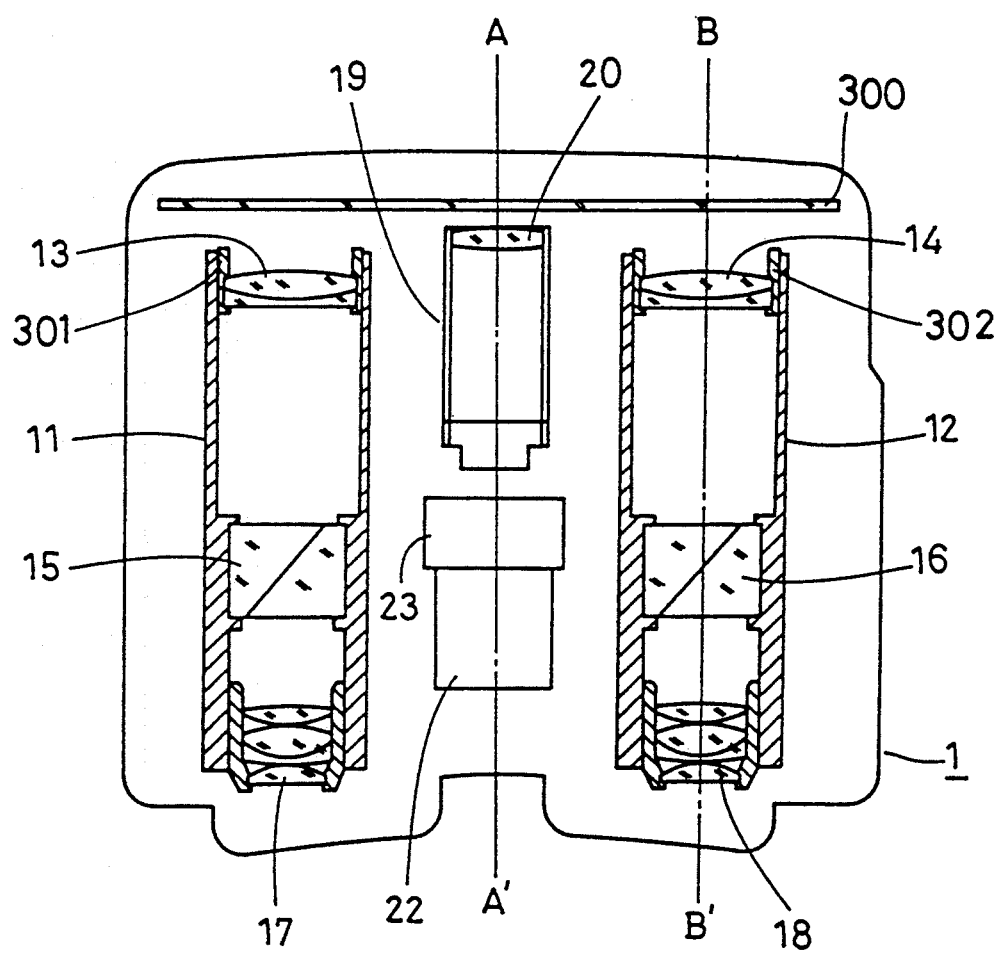
FIG. 3 is a horizontal cross-sectional view of the binocular showing the optical system and an object distance detecting module of one embodiment of the present invention.

A transparent glass plate 300 is provided on the front cover 9 (FIG. 3). Inside of the glass plate 300, the first and the second barrels 11 and 12 are placed in parallel (FIG. 3). The first and second barrels 11 and 12 have object lens units 13 and 14, respectively. Inside of the glass plate 300, light admitting window 20a is also placed. The height (dimension vertical to the plane of FIG. 3) of the light admitting window 20a is designed to be smaller than that of the object lenses 13 and 14 so that the overall height of the binocular 1 is not increased by the light admitting window 20a. Eye piece hoods 10a and 10b are attached on the rear cover 10 for respective view windows.

The optical system of the binocular 1 is composed of, as illustrated in FIG. 3, the two (first and second) symmetrical barrels 11 and 12 with the axis of symmetry A—A'. In each barrel 11, 12, an object lens unit 13, 14 is placed at the front, a prism unit 15, 16 is at the middle, and an ocular 17, 18 is placed at the rear end. The object lens units 13 and 14 move simultaneously along the optical axis of the respective barrels for the auto-focusing, while the oculars 17 and 18 move independently along the optical axes for the dioptric power adjustment. The distance between the first and second barrels 11 and 12 can be altered for adjusting to the viewer, which is detailed later.

Here, optical systems of another embodiment shown in FIGS. 4A and 4B will be described. Some portions of the implementation of FIGS. 4A and 4B are identified by the same reference designation by which they are identified in FIG. 3.

Figure 4A:
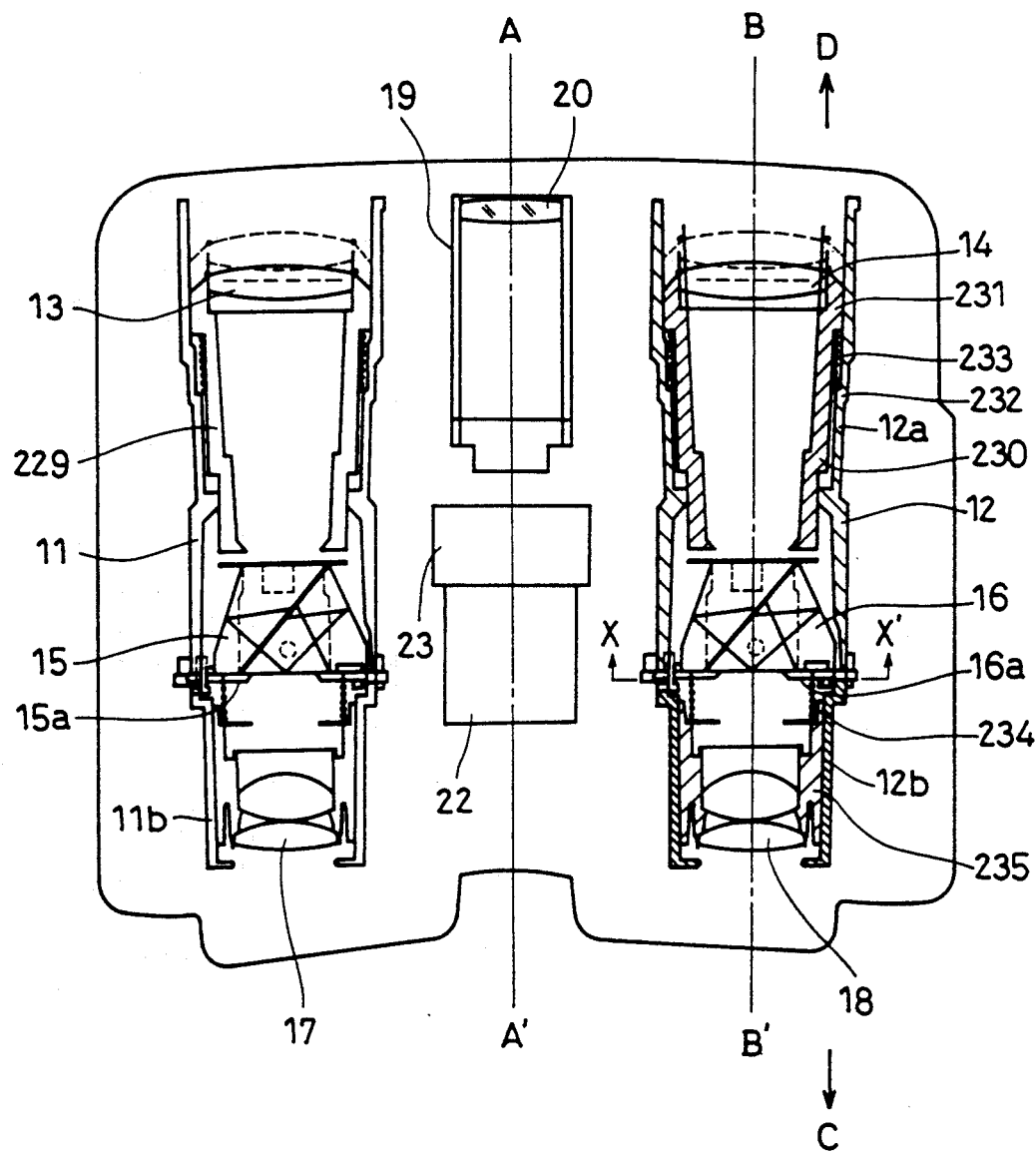
FIG. 4A is a horizontal cross-sectional view of the binocular showing the optical system and an object distance detecting module of another embodiment of the present invention.
Figure 4B:
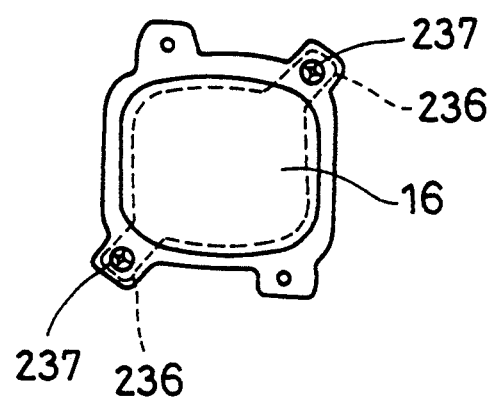
FIG. 4B is a cross-sectional view of the binocular taken on the line X—X' of FIG. 4A.

In FIG. 4A, object lens units 13 and 14 and the oculars 17 and 18 arranged in barrels 11 and 12 are pushed in one direction in the barrels 11 and 12, respectively. Since the structures of the barrels 11 and 12 are identical, in this embodiment, the explanation is given referring only to the barrel 12.

The barrel 12 is composed of a front barrel 12a and a rear barrel 12b screwed on each other. In the front barrel 12a is inserted an inner object lens cylinder 230 where the object lens unit 14 is fixed. Between the thicker part 231 of the inner object lens cylinder 230 and the interval steplike part 232 of the front barrel 12a is placed a coiled spring 233.

Because of this coiled spring 233, the inner object lens cylinder 230 is always pushed forward (the direction shown by the arrow D) against the barrel 12. This pushing restrains the mechanical shake on the lens driving path from an AF motor 22, through a reduction gear unit 23 or a speed reduction transmitting mechanism, both of which are to be described later, to the inner object lens cylinder 230.

Similarly, a coiled spring 234 is placed between an inner ocular cylinder 235 inserted in the rear barrel 12b and a prism frame 16a for supporting the prism 16. The prism frame 16a is fixed with screws 237, as shown in FIG. 4B, at screwing parts 236 on the rear end of the front barrel 12a. Accordingly, the inner ocular cylinder 230 holding the ocular 18 is always pushed rearward (the direction shown by the arrow C) against the barrel 12. In this embodiment, as described later, the oculars are manually driven backward and forward through a dioptric power adjusting mechanism. The mechanical shake in the dioptric power adjusting mechanism is restrained by the pushing of the coiled spring 234.

An object distance detection module 19 is provided between the barrels 11 and 12 whose optical axis coincides with the symmetrical axis A—A'. The module 19 has a front lens 20. Behind the module 19 are placed an AF motor 22 and a reduction gear unit 23 or a speed reduction transmitting mechanism for driving the object lens units 13 and 14. The module 19 of the present embodiment uses the phase difference detecting method, but any other detecting method can be used without departing the scope of the present invention.

Figure 5:
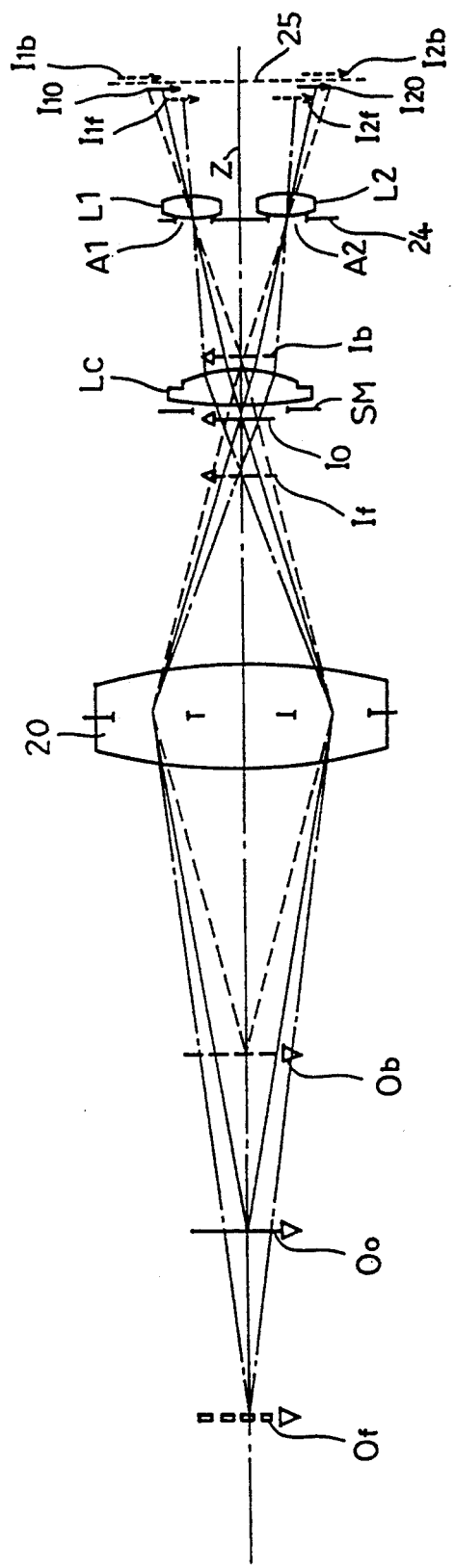
FIG. 5 is an optical diagram of the distance detecting module of the binocular.

The module 19 is detailed here referring to FIG. 5. A field stop SM and a condenser lens LC are placed proximate to the focus point of the front lens 20. A pair of rear lenses (image re-forming lenses) L1 and L2 are placed symmetrically at either side of the optical axis Z, and a mask plate 24 is placed in front of the rear lenses L1 and L2 with an aperture A1, A2 for each of the rear lenses L1 and L2. At the focus point of the rear lenses L1 and L2 is placed a CCD (Charge Coupled Device) line sensor 25. The condenser lens LC has the optical power such that images at the apertures A1 and A2 of the mask plate 24 are focused at a predetermined point of the front lens 20. The diameter of the apertures A1 and A2 is chosen so that only a portion of light from an object passing through the front lens 20 corresponding to a specific aperture value (e.g., F number 5.6) can pass through the apertures A1 and A2.

The images If, Io and Ib respectively correspond to the objects Of, Oo and Ob in front of the front lens 20. The secondary images of the primary images If, Io, Ib formed by the rear lenses L1 and L2 are denoted by I1f, I1o, I1b and I2f, I2o, I2b, respectively. As shown in FIG. 5, the secondary images I1o, I2o of the intermediate object Oo is focused slightly in front of the line sensor 25; those I1f, I2f of the far object Of is focused in front of the secondary images I1o, I2o and nearer to the optical axis Z; and those I1b, I2b of the near object Ob is focused at the rear of the secondary images I1o, I2o and farther from the optical axis Z. This means that the distance between a pair of the secondary images (e.g., between the secondary images I1o and I2o) corresponds to the position of the object from the binocular 1. When the distance between a pair of the secondary images is detected larger than that of the intermediate object Oo, the object is judged nearer to the front lens 20, and the deviation from the standard distance (i.e., the distance between the secondary images I1o and I2o of the intermediate object Oo) detected by the line sensor 25 can be used to determine the distance of the object from the standard position Oo. Since a pair of the secondary images are identical, a microcomputer (a system controller 140 shown in FIG. 18) provided in the binocular 1 calculates the distance between the secondary images sensed by the line sensor 25 using a known shifting method. The microcomputer then judges whether it is currently in an in-focus condition or not and calculates the defocus amount. The phase difference detecting method as used in this embodiment is advantageous compared to the triangulation method because it is sufficient to receive one directional light. Thus the module 19 of the phase difference detecting type fits a binocular 1 because it can be placed between the barrels 11 and 12 to realize a compact size of the binocular. Of course a module of the triangulation type can be used when the demand for the precision is not so severe. A contrast method can also be used in the focusing.

The auto-focusing (AF) system of the binocular 1 is the open-loop control type, in which the microcomputer calculates a defocus amount based on the output from the line sensor 25 and drives the motor 22 (thus the object lens units 13 and 14) according to the defocus amount. Since human eyes have a focusing function in themselves, the precision of the focusing function of the binoculars can be rough compared to cameras and the feedback control is not necessary in binoculars. Of course the feedback control system can be adopted for obtaining better focusing precision. The binocular 1 of the present embodiment does not use the object lens units 13 and 14 in detecting the focus condition, and the lens units 13 and 14 are moved by a shift amount corresponding to the defocus amount which is calculated by the microcomputer based on the output data of the module 19 which is provided in no relationship with the object lens units 13 and 14.

Figure 6:
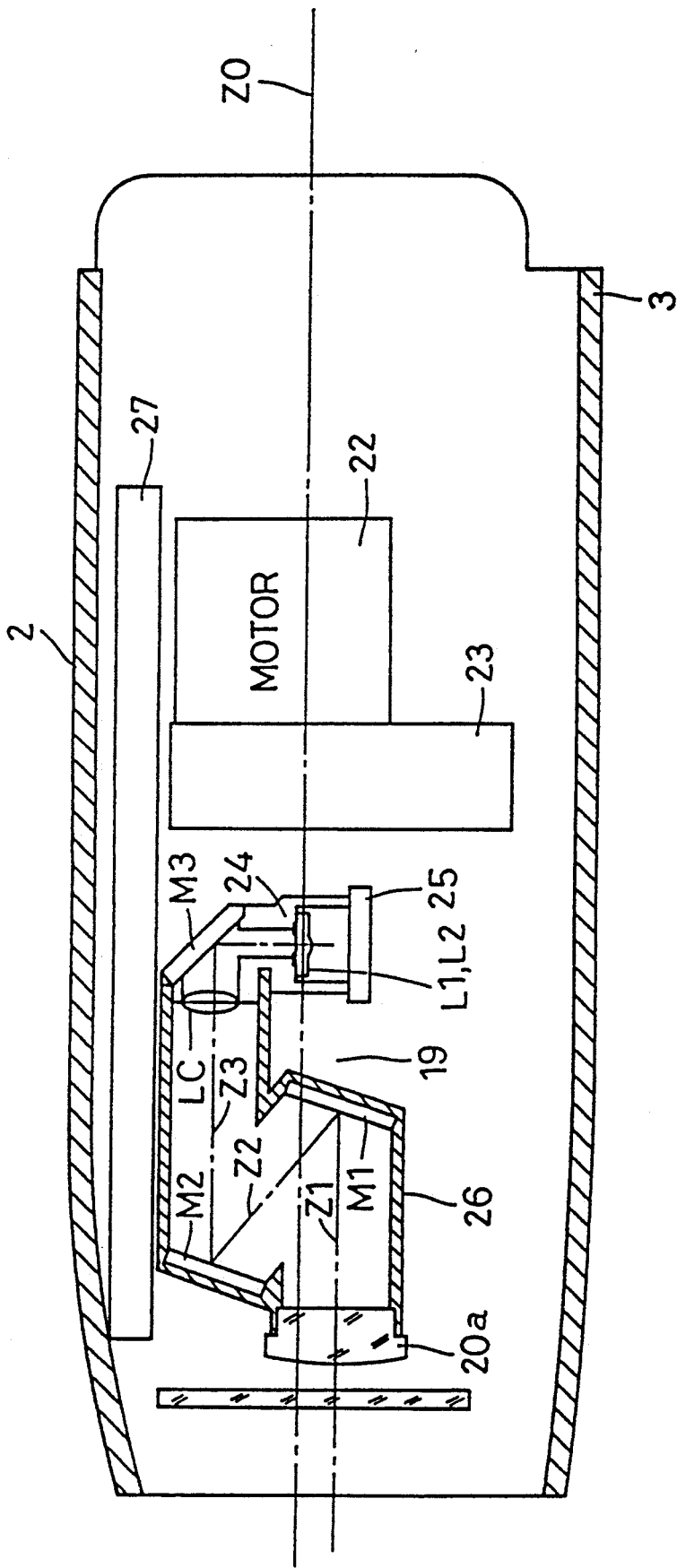
FIG. 6 is a vertical cross-sectional view of the binocular taken on the line A—A' of FIG. 4A.

As shown in the vertical cross-sectional view FIG. 6 of the binocular 1 taken along the center line A—A', the optical axis of the module 19 bends like "Z" between the front lens 20 and the condenser lens LC with the reflection mirrors M1 and M2, and then bends downward to the rear lenses L1 and L2 with a mirror M3. That is, the mirror M1 obliquely reflects the light led rearward by the light admitting window 20a toward the upper front, the mirror M2 rearwardly reflects the light reflected by the mirror M1 and the mirror M3 downwardly reflects the light reflected by the mirror M2. The mirror M1 may reflect the light toward the lower front in place of reflecting it toward the upper front to the contrary of the embodiment. This optical arrangement reduces the total length of the module 19 (as a result, the module 19 is shorter than the first and second barrels 11 and 12) while obtaining enough optical length for the front lens 20. Longer focal length of the front lens improves the precision in the focus detection. The shift (defocus amount) s of a lens from the infinity focusing position is:

$$s = f^2/(l-f)$$

where f is the focal length of the lens and l is the distance from the lens to the object. Provided f=30 mm and l=4000 mm, the shift s is $30^2/(4000-30)=0.22$ mm. If f is increased to 60 mm, the shift s is $60^2/(4000-60)=0.91$ mm. This calculation shows that a front lens with a longer focal length whose defocus amount changes largely with respect to the change of the distance to the object is advantageous in improving the precision.

Figure 8:
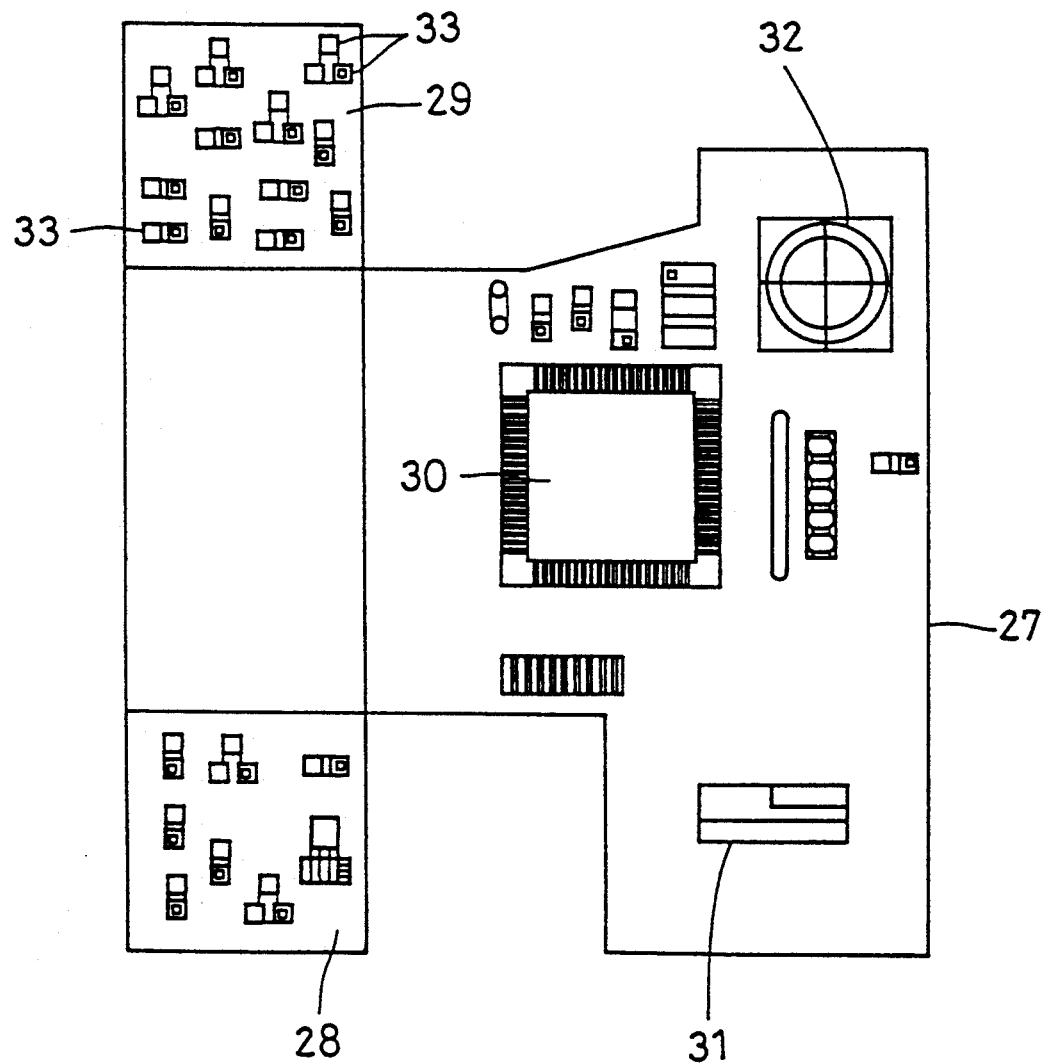
FIG. 8 is a plan view of a flexible printed circuit board used in the binocular.

A flexible printed circuit board 27 is provided above the module 19, motor 22 and the reduction gear unit 23 of a speed reduction transmitting mechanism, whose plan view is shown in FIG. 8. The wings 28 and 29 in the front part of the circuit board 27 are actually bent down to wrap the module 19 and are fixed to the side walls of the module 19 with a double-faced tape and the like. On the rear part of the circuit board 27 are provided a microcomputer 30, a conductive pattern 31 for the main switch and another conductive pattern 32 for the AF switch. The circuit board 27 further includes many electronic elements 33 constituting predetermined circuit.

Figure 7:
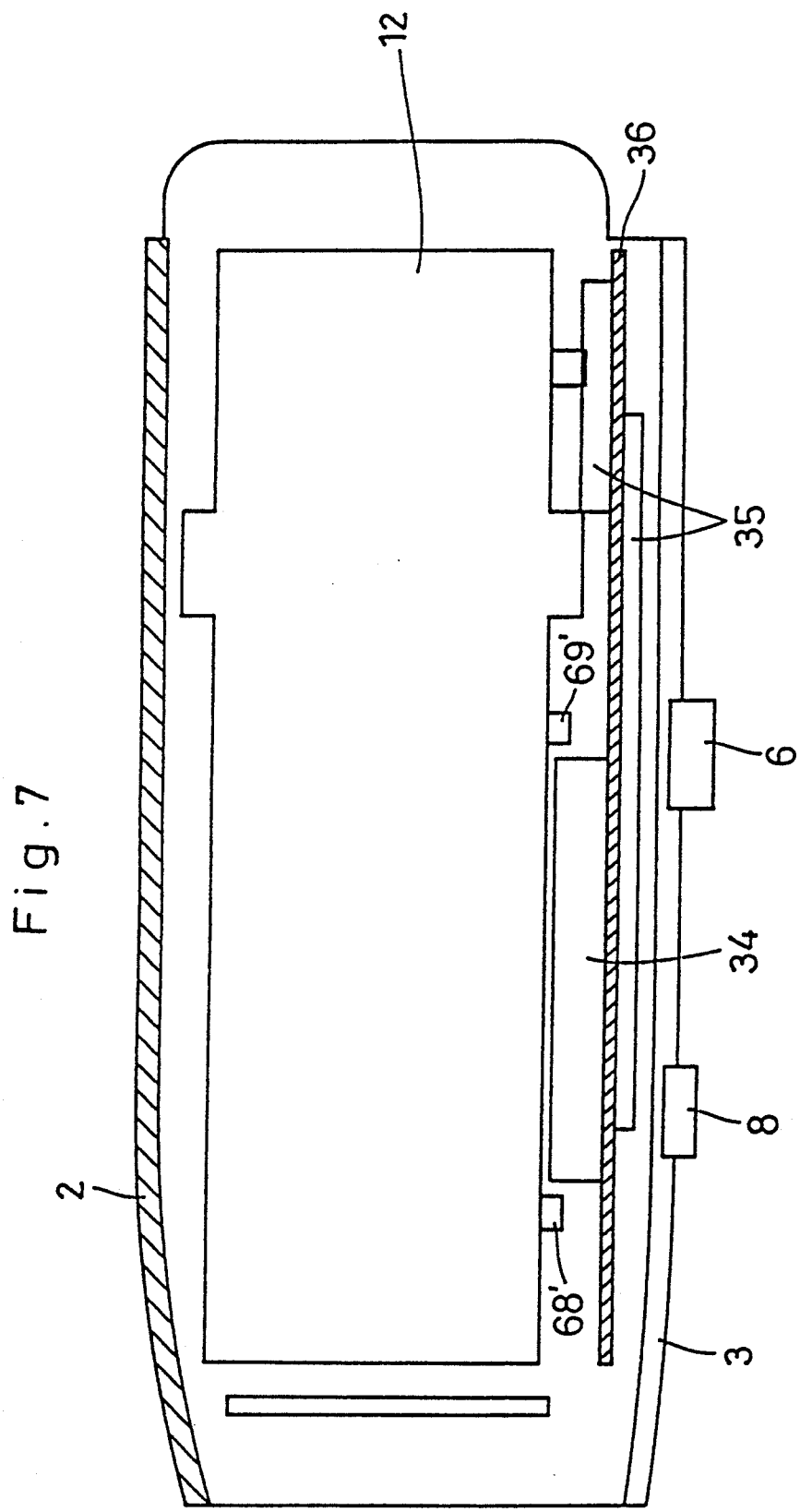
FIG. 7 is a vertical cross-sectional view of the binocular taken on the line B—B' of FIG. 4A.

As shown in the cross-sectional view of FIG. 7 taken along the line B—B' of FIG. 3 passing through the center of a barrel, an pupil distance adjusting mechanism 34 and a dioptric power adjusting mechanism 35 are provided under the barrels 11 and 12. These mechanisms 34 and 35 are placed on a base plate 36. The fifth operation member 8 and the third operation member 6 are shown in FIG. 7.

Since the circuit board 27 is placed over the barrels 11 and 12 and the mechanisms 34 and 35 are placed under the barrels 11 and 12 within the housing, the body of the binocular 1 of the present embodiment can be compact. The separate arrangement (the electrical system and the mechanical system are separated) improves the serviceability of the whole system: when one of the systems breaks, the system is easily replaced without influencing the other.

It is possible to place the mechanical system upward and the electrical system downward, contrary to the present embodiment. But the arrangement of the present embodiment is better in that: the circuit board 27 can be near the operation members (the first operation member 4 and the second operation member 5) which are frequently operated by forefingers or middle fingers, while the pupil distance adjusting operation member or the dioptric power adjusting operation member are not so often operated.

Figure 9:
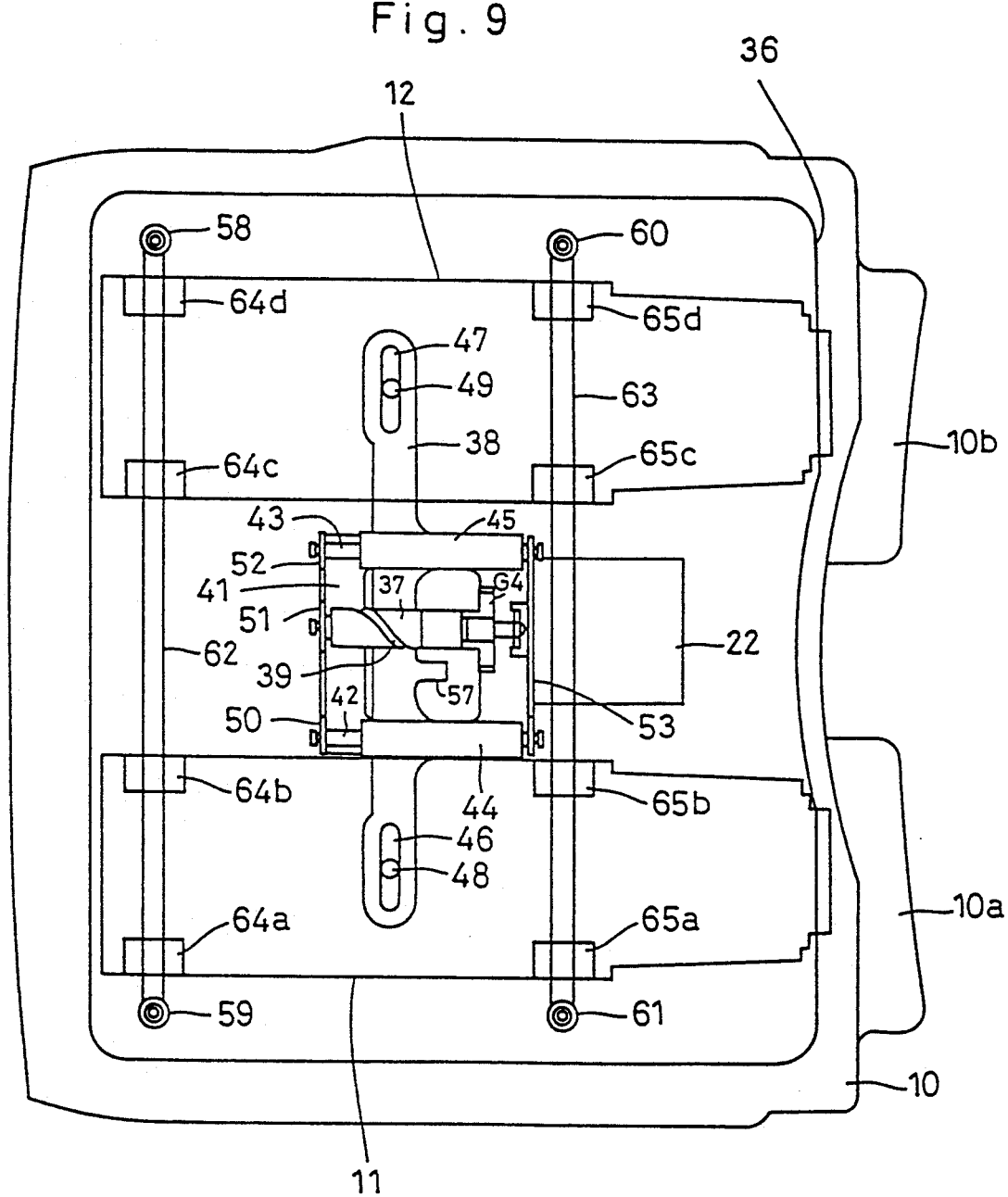
FIG. 9 is a plan view of a mechanical diagram of the AF mechanism of the binocular.
Figure 10:
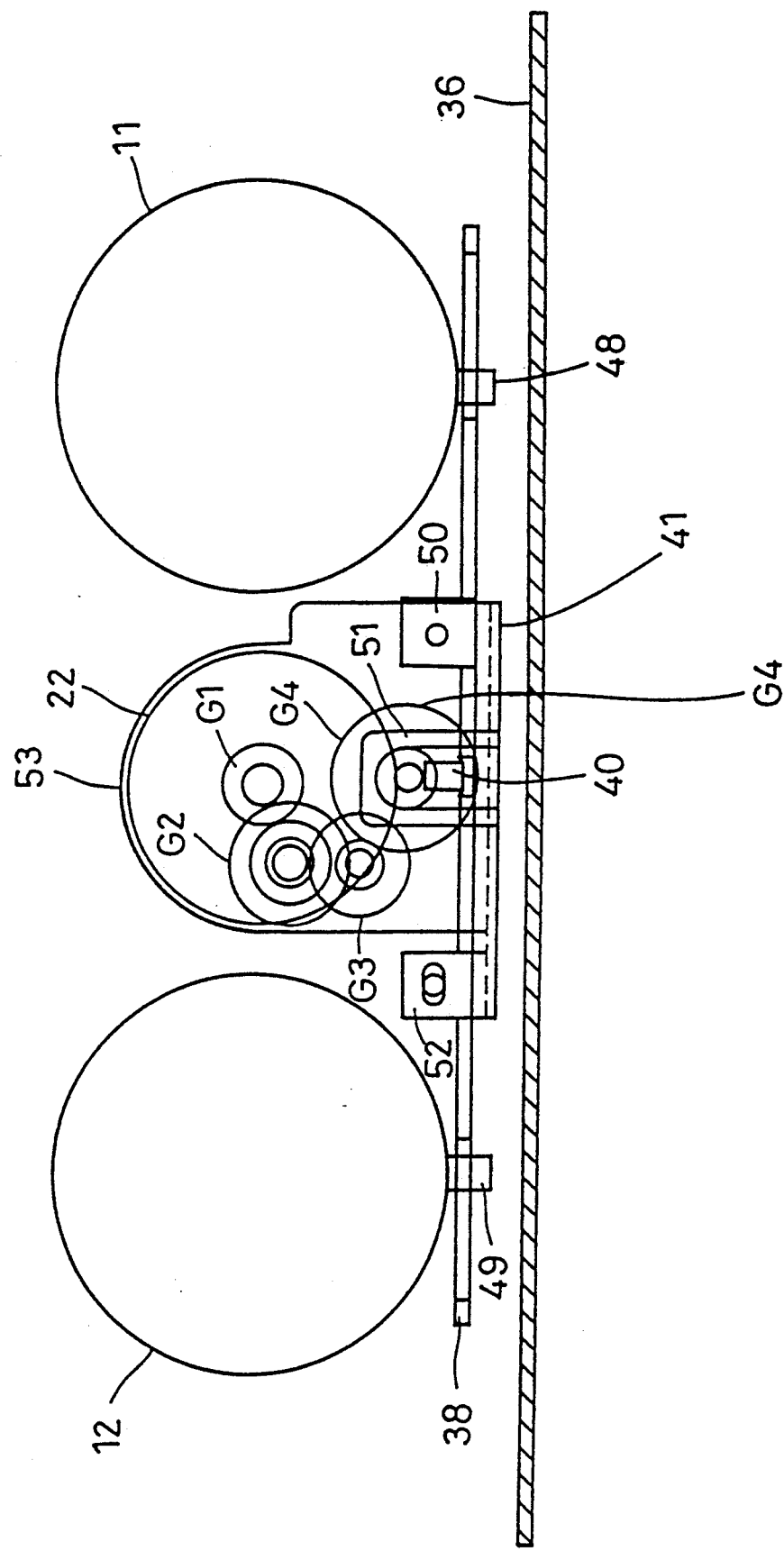
FIG. 10 is front view of the mechanical diagram of the AF mechanism of the binocular.
Figure 11:
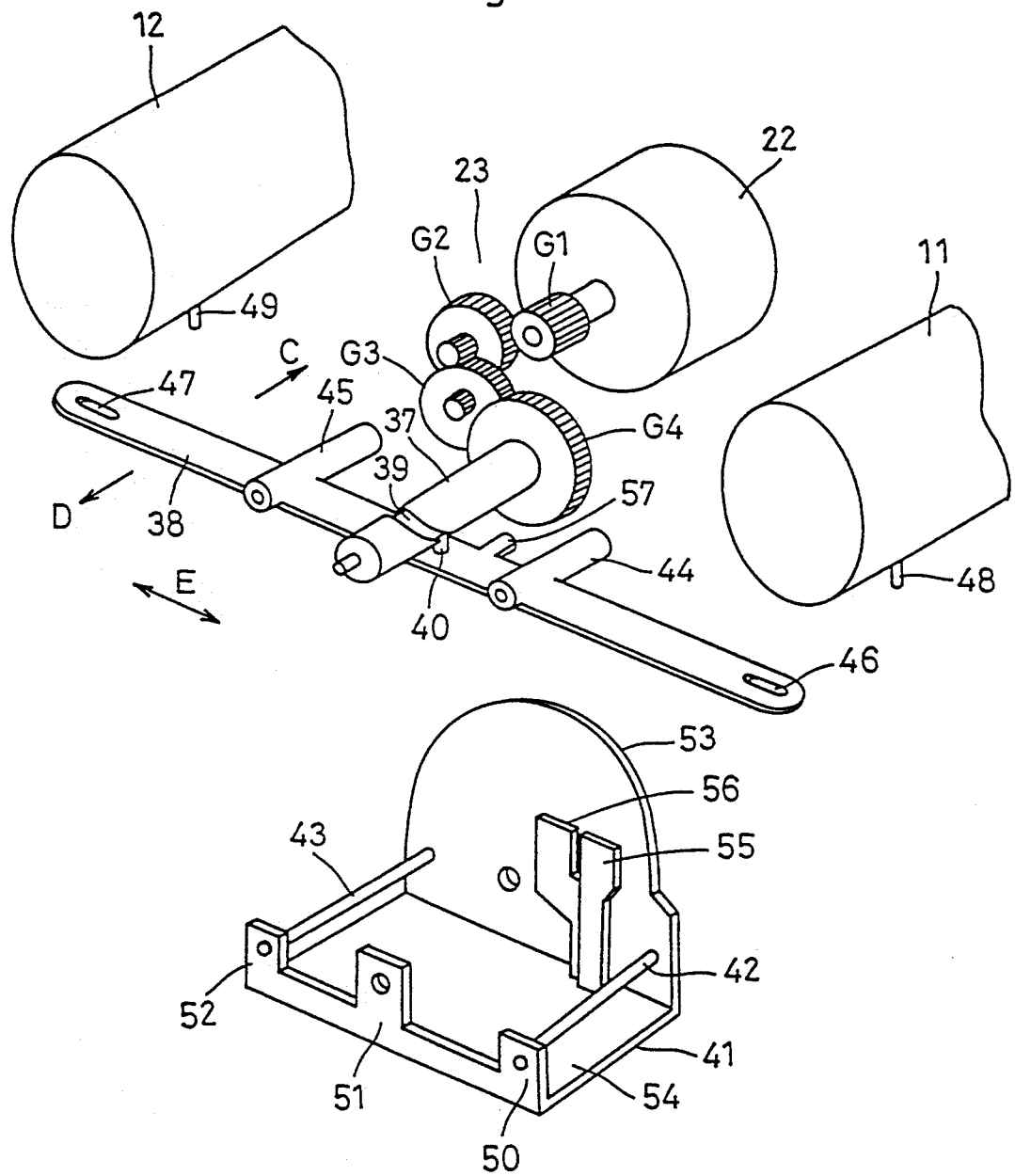
FIG. 11 is a broken perspective view of the AF mechanism.

An AF mechanism for driving the object lenses 13 and 14 is placed at the center of the housing extending to under the barrels 11 and 12, as shown in FIGS. 9–11. The AF mechanism includes: the motor 22, the reduction gear unit 23, a cam shaft 37, and a lever 38. The reduction gear unit 23 or a speed reduction transmitting mechanism is composed of four gears G1–G4, and the final gear G4 of the gear unit 23 is connected to the cam shaft 37, as shown in FIG. 11. The cam shaft 37 has a helical groove 39 which receives a pin 40 implanted on the lever 38, thus the lever 38 moves longitudinally (as the arrow C or D) when the cam shaft 37 rotates. The longitudinal movement of the lever 38 is guided by a pair of hollow cylinders 44 and 45 fixed on the lever 38 and loosely mounted on respective shafts 42 and 43 fixed on a motor base 41. At either end of the lever 38 is provided a hole 46, 47 which admits a pin 48, 49 projecting from each barrel 11, 12. The pin 48, 49 projects from the inner object lens cylinders 301 and 302 shown in FIG. 3 or the inner object cylinders 229 and 230 shown in FIG. 4A. The holes 46 and 47 are made long vertically to the direction of the movement to allow the alteration of the pupil distance (direction E).

The motor base 41 has three vertical support plate 50, 51, 52 at the front end for supporting the front ends of the lever-mounting shafts 42, 43 and the cam shaft 37, and another support plate 53 at the rear end for supporting the rear ends of the three shafts 42, 43, 37. From the base plate 54 of the motor base 41 near the rear end support plate 53 stand a pair of resilient metal plates 55 and 56 (FIG. 11) which make an electric contact for detecting that the lever 38 (i.e., the object lens units 11 and 12) has come to the end of the C direction (i.e., the optical system is in-focus at infinity): when the lever 38 comes to the end, a projection 57 of the lever 38 pushes one of the metal plate 55 to make contact with the other 56.

Generally, there is more or less clearance at the gearing parts of the above-described gears G1-G4 and at other engaging parts (such as between the pins 48, 49 and the holes 46, 47 or between the cam shaft 39 and the pin 40). Therefore, if such clearance is not removed, a problem arises in that, while the motor is being stopped, the object lens units are moved by the shake resulting from external shock or from moving thereby causing the binoculars to be out-of-focus.

As described above, in the embodiment of FIG. 4A, since the inner object lens cylinder 230 is pushed in a direction D by the coiled spring 233 placed in the barrels 11 and 12, the pushing force is transmitted through the pins 48 and 49, the lever 38 and the cam shaft 37 to the gears G4-G1 to push the lens driving mechanism system in one direction. As a result, the clearances between the gears and between other engaging parts which cause the shake are removed, and the problem that the object lens units are unintentionally moved (when, for example, the binocular is suddenly inclined) is prevented.

To prevent such shake of the lens driving mechanism, the direction of the pushing by the coiled spring 233 is not necessarily D; it can also be the opposite direction C. Also, the coiled spring 233 is not necessarily placed inside the barrel 12; it can be arranged outside the barrel. For example, one end of the coiled spring 233 whose other end is fixed can be fixed to or engaged with the pins 48 and 49, or the lever 38.

Referring to FIG. 9, four columns 58, 59, 60, 61 stand at the left and right ends of the base plate 36, and two shafts 62 and 63 are supported by respective two columns 58, 59 and 60, 61. The two barrels 11 and 12 are movably supported on the two shafts 62 and 63 (with brackets 64a-64d and 65a-65d having a closed hole or an open hole fixed at the bottom of the barrels 11, 12) at the front and at the rear to adjust the pupil distance (FIG. 13).

The pupil distance adjusting mechanism 34 is detailed referring to FIGS. 12A-12C, 13 and 14. A first adjusting plate 66 and a second adjusting plate 67 are provided for the first and second barrels 11 and 12 respectively. The first adjusting plate 66 is composed of a first arm 72, a second arm 75, a third arm 77 and a fourth arm 82. The first arm 72 has vertically L-shaped ends 73 and 74 at the front and rear ends respectively. Each of the L-shaped ends 73 and 74 has a hole 70, 71 for admitting respective pin 68, 69 projecting downward from the first barrel 11. The second arm 75 extends externally from the center of the first arm 72 and has a long and narrow hole 76 for admitting a pin 78. The third arm 77 extends also externally from near the L-shaped end 73 of the first arm 72, and has an L-shaped end 79 with a hole 80 for engaging with a link plate 81. The fourth arm 82 extends internally from the first arm 72 at the center to the second barrel 12, and has a long hole 85 at the end 83 for admitting a pin 84 (corresponding to the pin 78). The fourth arm 82 has another longitudinally, long hole 86 at the midpoint for admitting a pin 88 of the pupil distance adjusting member (third operation member) 6.

The second adjusting plate 67 is composed of a first arm 89, a second arm 90 and a third arm 92. The first arm 89 (which corresponds to the first arm 72 of the first adjusting plate 66) is for fixing the second adjusting plate 67 to the second barrel 12. The second arm 90 (which corresponds to the second arm of the first adjusting plate 66) has a long hole 91 for admitting the pin 84. The third arm 92 (which corresponds to the fourth arm 82 of the first adjusting plate 66) extends externally toward the first barrel 11. The third arm 92 has an end 93 corresponding to the end 83 of the first adjusting plate 66, but the third arm 92 of the second adjusting plate 67 has an L-shaped end 94 further extending from the end 93. The L-shaped end 94 has a hole 95 for engaging with the link plate 81. At the center of the third arm 92 is formed a laterally long (i.e., perpendicular to the hole 86 of the fourth arm 82 of the first adjusting plate 66) hole 96 for admitting the pin 88 of the pupil distance adjusting member (third operation member) 6. The link plate 81 for linking the first and second adjusting plates 66 and 67 has L-shaped ends 97 and 98, and a hole 101 is formed at the center for a pivot pin 100. The L-shaped ends 97 and 98 have long holes 104 and 105 respectively for admitting link pins 102 and 103.

Figure 12A:
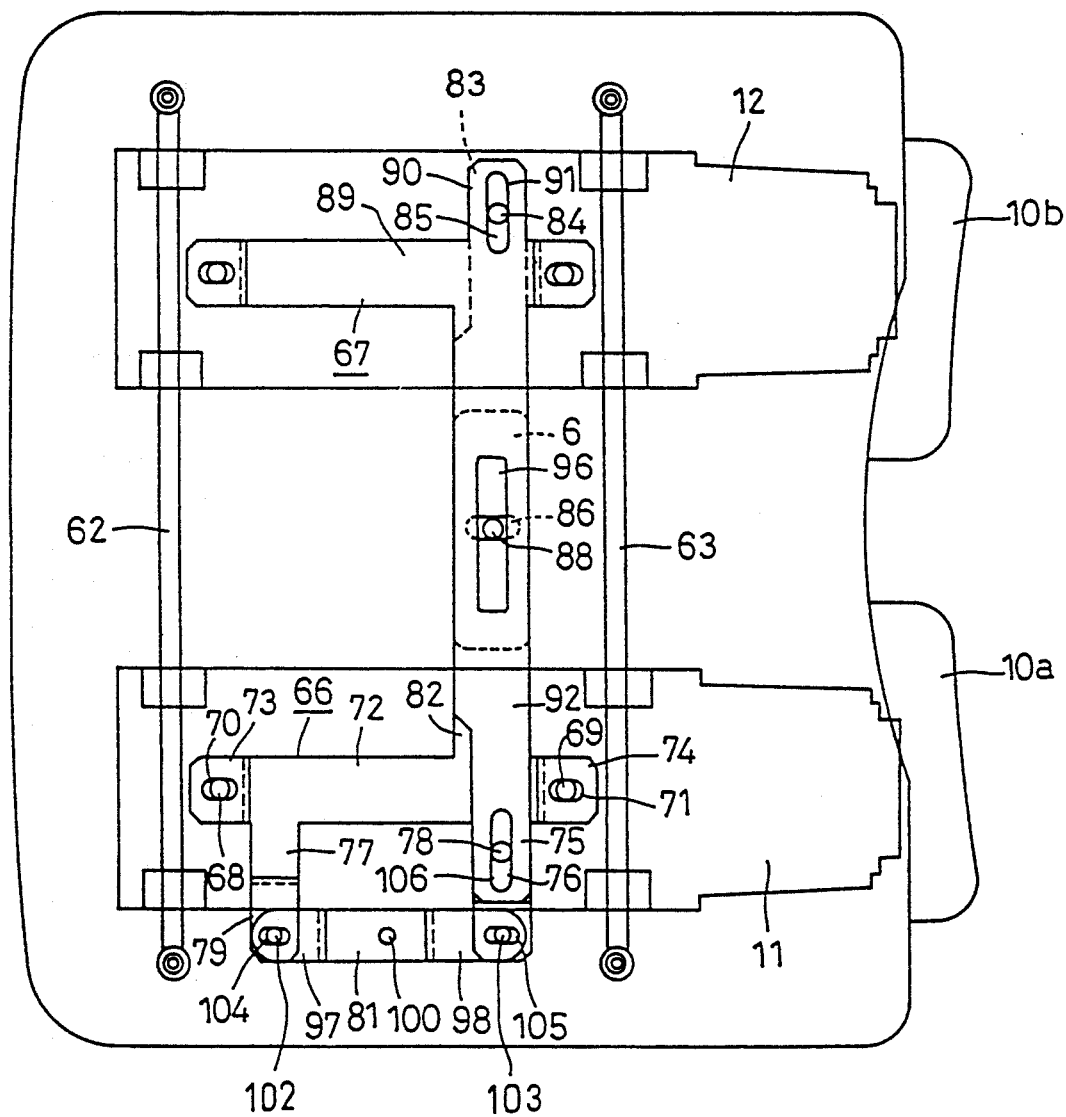
FIG. 12A is a plan view of the pupil distance adjusting mechanism of the binocular.
Figure 12:
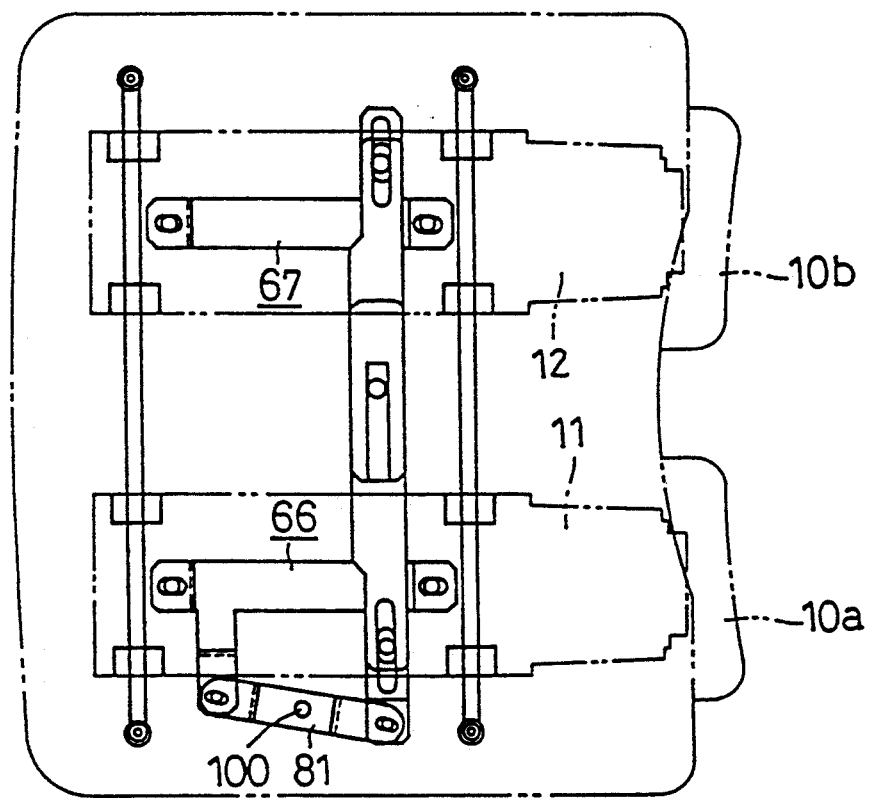
FIG. 12B shows one state and FIG. 12C shows another state of the pupil distance adjusting mechanism.
Figure 12C:
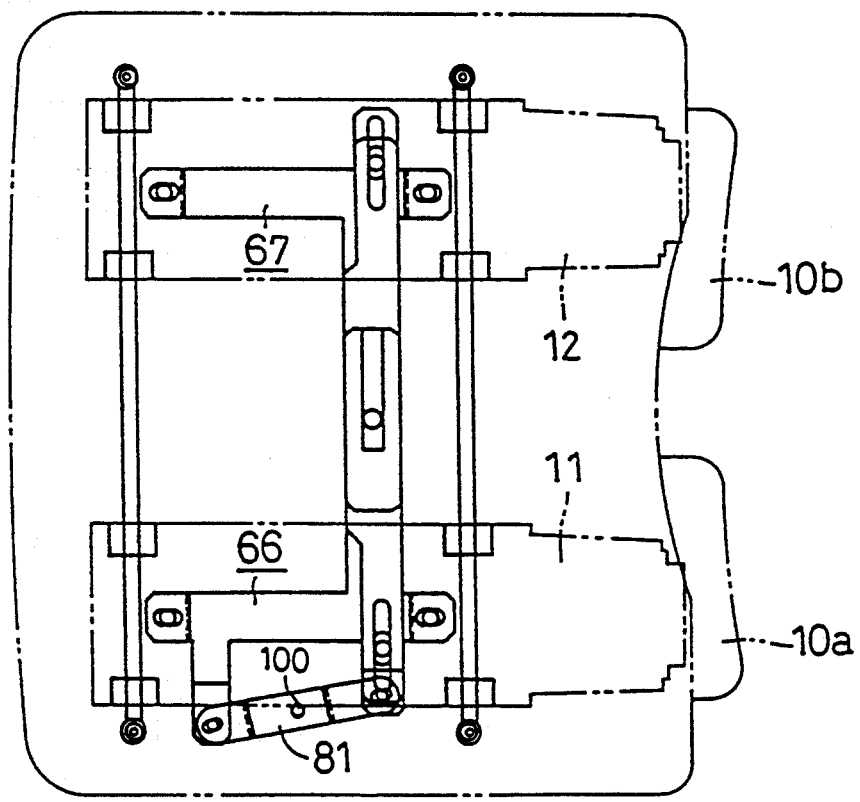

The operation of the pupil distance adjusting mechanism 34 is now explained referring to FIG. 14. When the pupil distance is to be widened, the third operation member 6 is moved toward the direction F. The pin 88 of the third operation member 6 pulls the first adjusting plate 66 with the hole 86, and the first adjusting plate 66 is dragged to the same direction F because the first adjusting plate 66 is guided by the pins 78 and 84 with the long holes 76 and 85 formed at the ends 75 and 83. The F-direction motion of the first adjusting plate 66 gives the second adjusting plate 67 the opposite motion because they are linked by the link plate 81 pivoting on the pin 100 (direction H). The second adjusting plate 67 is guided by the pins 78 and 84 with the long holes 106 and 91. The symmetrical motions of the first and second adjusting plates 66 and 67 widens the distance of the first and second barrels 11 and 12 fixed to the first and second adjusting plates 66 and 67 with four pins 68, 69, 68' and 69'. The widemost state is shown in FIG. 12C.

When the pupil distance is to be narrowed, the third operation member 6 is moved opposite to the direction F. The movements of the first and second adjusting plates 66 and 67 are just the opposite to the case above, and the barrels 11 and 12 come closer as shown in FIG. 12B.

Figure 16:
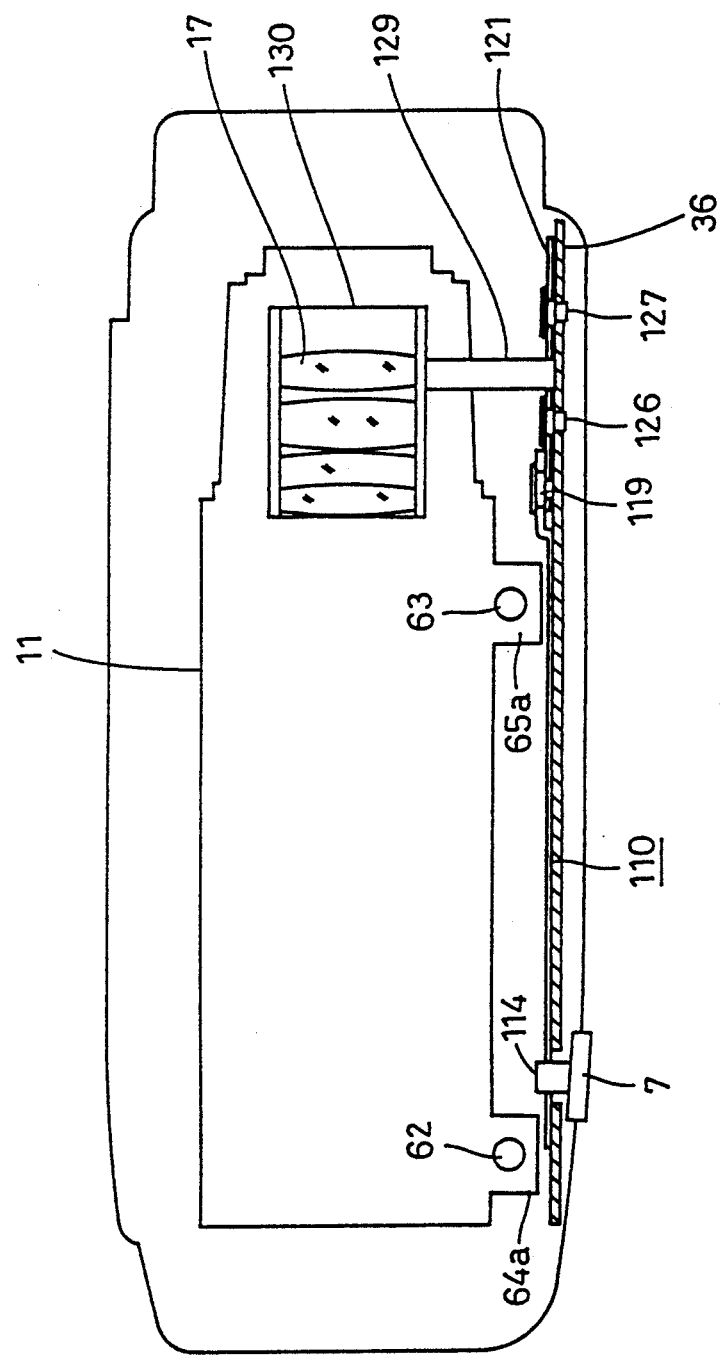
FIG. 16 is a cross-sectional view of the dioptric power adjusting mechanism.
Figure 17:
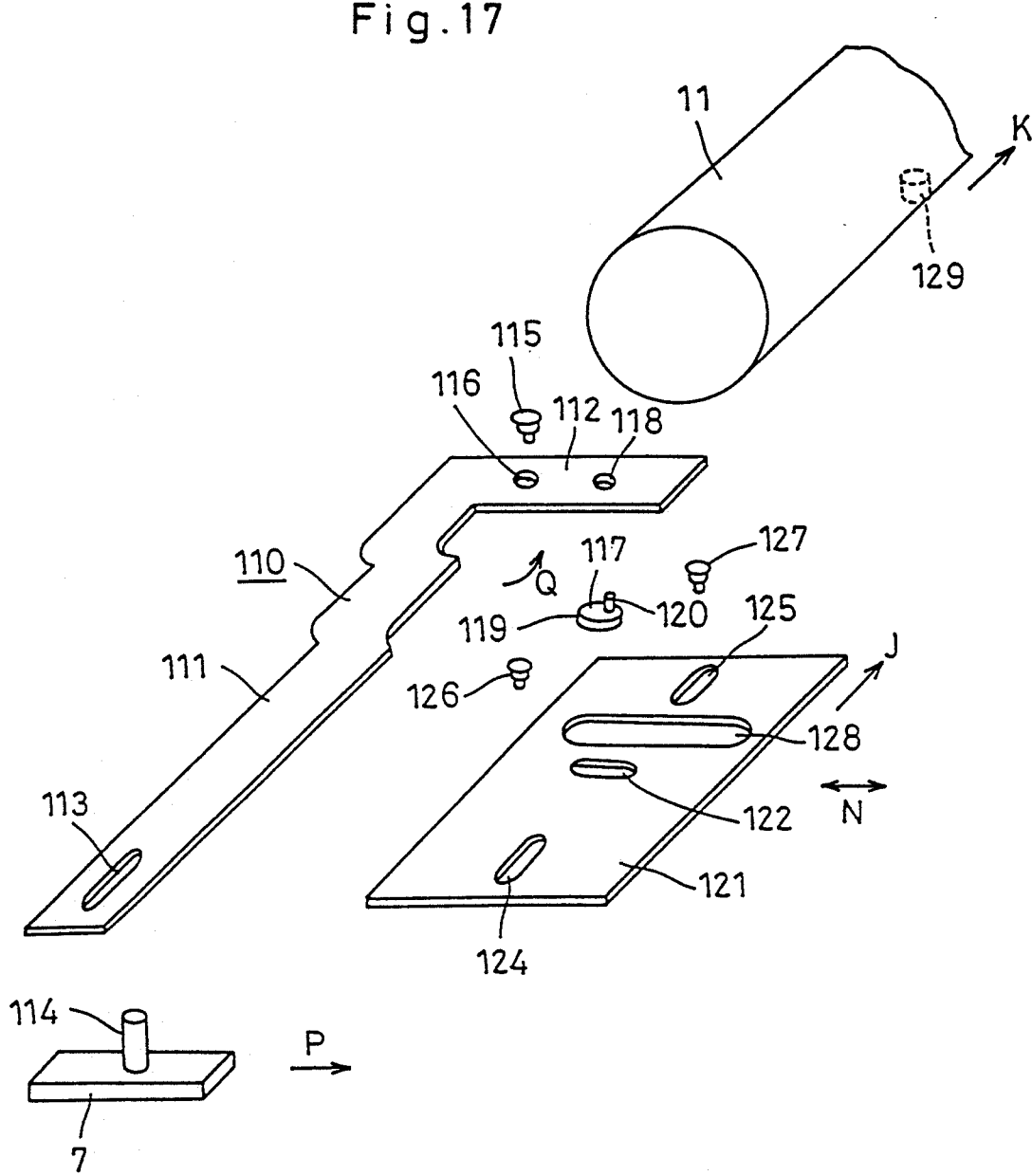
FIG. 17 is a broken perspective view of the dioptric power adjusting mechanism.

Then the dioptric power adjusting mechanism 35 is described referring to FIGS. 15-17. Since, as described before, the dioptric power can be adjusted independently at the two barrels 11 and 12, that of one barrel (the first barrel 11 in FIG. 17) is now explained. The dioptric power adjusting member (fourth operation member) 7 engages with an L-shaped lever 110 composed of a first arm 111 and a second arm 112. At the front end of the first arm 111 is formed a long hole 113 for admitting a pin 114 of the fourth operation member 7. The second arm 112 has a hole 116 for admitting a pin 115 fixed on the base plate 36, and the lever 110 pivots on the pin 115. The second arm 112 has another hole 118 for admitting a pin 120 of a connector 117.

A rectangular plate 121 is placed between the lever 110 and the base plate 36 and is pressed by the lever 110 as shown in FIG. 16. A pair of longitudinally long holes 124 and 125 are provided at the longitudinal ends of the rectangular plate 121, and pins 126 and 127 fixed (by a screw, for example) on the base plate 36 pass through the holes 124 and 125 respectively, whereby the rectangular plate 121 can move in the direction J. A laterally long (in order to allow the lateral pupil distance adjusting movement of the barrel 11) hole 128 is formed in the rectangular plate 121 for admitting a pin 129 projecting downward from the barrel 11. The pin 129 is, as shown in FIG. 16, fixed on an inner cylinder 130 of the ocular 17. When the rectangular plate 121 moves in the direction J, the barrel moves parallel in the direction K. A circular base plate 119 of the connector 117 fits in another laterally long hole 122 of the rectangular plate 121. The pin 120 passing through the hole 118 of the second arm 112 of the lever 110 stands at a deviated position from the center of the base plate 119 of the connector 117 in order to adjust a fine position of the connector 117 in assembling the binocular 1. In the fine adjustment, the connector 117 is rotated to minutely move the barrel 11 so that the optical system of the barrel 11 is in-focus at infinity when the object lens unit is brought to the position at infinity by the contact switch 55 and 56 (FIG. 11) and the fourth switch 7 is at a preset standard position (click stop is preferably provided).

The operation of the dioptric power adjustment is as follows. When the fourth operation member (dioptric power adjusting member) 7 is moved to the direction P in FIG. 17, the lever 110 rotates on the pivot 115 in the direction Q, which drives the rectangular plate 121 to the direction J and the inner ocular cylinder 130 to the direction K. When the fourth operation member 7 is moved to the opposite direction, the movements of the lever 110 and the rectangular plate 121 are just the opposite to drive the inner ocular cylinder 130 in the opposite direction to K. Since normally it is easier to adjust the dioptric power when the object lens is in-focus at infinity, it is preferable to make the above-described dioptric power adjustment after the position of the object lens unit is reset at infinity by turning on the main switch by the first operation member 4 of the binocular 1 (in this case, it is supposed that the initializing routine of the binocular 1 includes positioning of the object lens unit at infinity). Instead of resetting the object lens unit at infinity, the AF mechanism can be used to make the dioptric power adjustment after the position of the object lens unit is brought into an in-focus position by the AF mechanism caused by turning on of the main switch.

A clearance exists in a direction in which the force is transmitted between the pin 114 of the fourth operation member 7 and the long hole 113 of the lever 110, among the connector 117, the hole 118 and the long hole 122, and between the pin 129 and the laterally long hole 128, respectively, and such clearances bring about the shake which deteriorates the accuracy of dioptric power adjustment.

However, in the embodiment of FIG. 4A, as described above, since the inner ocular cylinder 235 is pushed in a direction C (in a direction K in FIG. 17) by the coiled spring 234, the clearance at each gearing part of the dioptric power adjustment mechanism is removed by the pushing force and no shake is caused. Therefore, the machine moves smoothly and a highly accurate dioptric power adjustment is expected.

Needless to say, the direction in which the coiled spring 234 pushes is not necessarily C (K in FIG. 17); it can be the opposite direction. Also, the coiled spring 234 is not necessarily placed inside the barrel 12; it can be placed outside the barrel. In this case, one end of the coiled spring whose other end is fixed on the base plate 36 is attached to the lever 110, the plate 121 or the pin 129. Further, the pushing means is not necessarily a coiled spring 234; it can be replaced by other appropriate member.

The coiled spring 234 provided to push the dioptric power adjustment mechanism to prevent the shake in the above dioptric power adjustment mechanism system also represses the shake caused between the pupil distance adjusting levers 62, 63 and the barrels 11, 12. This mechanism is explained in the following.

In FIGS. 14 and 15, the barrels 11, 12 are so supported on the shafts 62, 63 fixed on the base plate 36 as to slide on the shafts, and are movable so that the distance between them is varied to adjust pupil distance. Since there is some clearance at the engaging parts of the shafts 62, 63 with the holes in the brackets 64a-64d, 65a-65d project from the barrels 11, 12, there is a possibility that the barrels 11, 12 incline in pupil distance adjustment to shift the optical axis. However, since the coiled spring 234 is placed between the inner ocular cylinder 235 and the prism 16, as described above, the entire barrels 11, 12 are pushed in a direction D in FIG. 4A against the dioptric power adjustment mechanism 35 pushed by the spring. Then, the clearance between the shafts 62, 63 and the holes in the brackets 64a-64d, 65a-65d of the barrels 11, 12 is pushed aside, and so, no shake is caused. Consequently, the barrels 11, 12 never incline in pupil distances adjustment, so that the optical axis does not substantially shift. The pushing means to prevent the shake between the shafts 62, 63 and the barrels 11, 12 is not necessarily the coiled spring; it can be replaced some other means, and as described before, the means can be placed outside the barrels.

Figure 18:
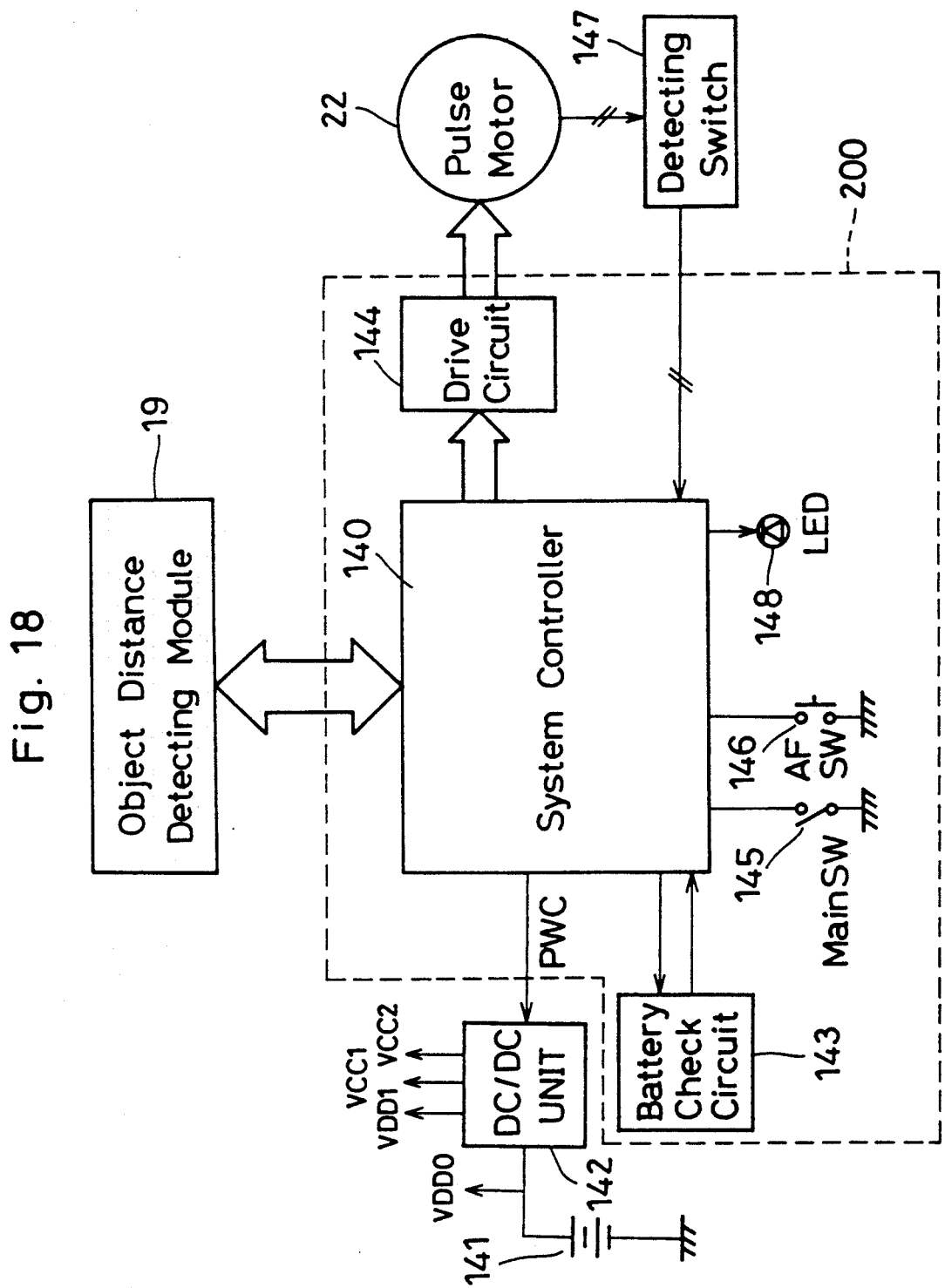
FIG. 18 is a block diagram of the electrical system of the binocular.

The electric system of the binocular 1 is now described referring to FIG. 18. The binocular 1 is controlled by a system controller 140 including a microcomputer. A battery 141 at voltage VDD0 is provided for the electrical system of the binocular 1. The source DC (direct current) power is supplied to a DC/DC converter unit 142 as well as to the motor 22. The DC/DC converter unit 142 generates direct current voltage VDD1 responding to the power control (PWC) signal from the system controller 140 and other direct currents voltages VCC1 and VCC2 to the module 19. Here, VDD1 and VCC1 are set at 5 V and VCC2 is set at 12 V. For saving the battery power, the system controller 140 generates the PWC signal such that the current voltages VCC1 and VCC2 are ceased when the module 19 is not necessary. The output value of the battery 141 is checked by a battery checking circuit (BCC) 143 which sends the source voltage data to the system controller 140.

A driver 144 for the motor 22 is controlled by the system controller 140. A main switch activated by the first operation member 4 is denoted as 145 in FIG. 18 and an AF switch activated by the second operation member is denoted as 146. A detecting switch for detecting an infinity-side end of AF range which is made of the resilient metal plates 55 and 56 (FIG. 11) is denoted as 147 here. The AF switch 146 is turned on only when the second operation member 5 is pushed against the spring force of the switch 146, and is turned off when the second operation member 5 is released. An AF operation by the module 19 and the AF motor 22, etc. is performed only when the AF switch is turned on. A light emitting diode (LED) 148 is provided for warning the operator when the battery power is exhausting (i.e., the battery checking circuit 143 detects the source voltage lower than a predetermined value) or when the contrast of the aiming object is too low. In case of the warning due to the LED 148, the operator may adjust the focus manually instead of using the AF function. The portion 200 of the circuit enclosed by the dashed line in FIG. 18 is mounted on the flexible printed circuit board 27 shown in FIG. 8.

Figure 19A:
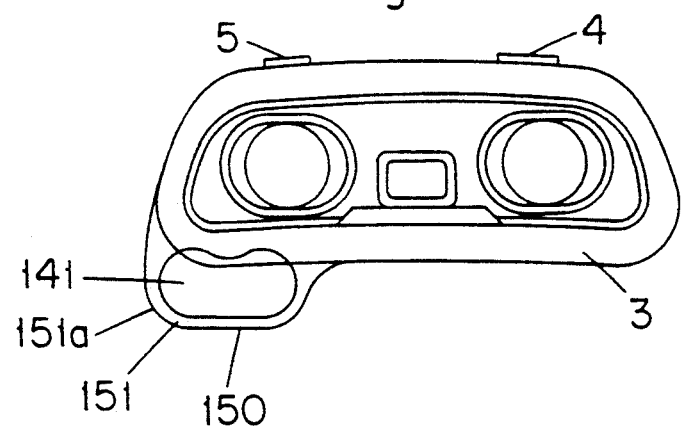
FIGS. 19A, 19B and 19C are a front view, plan view and side view, respectively, of the binocular with a battery holder.
Figure 19B:
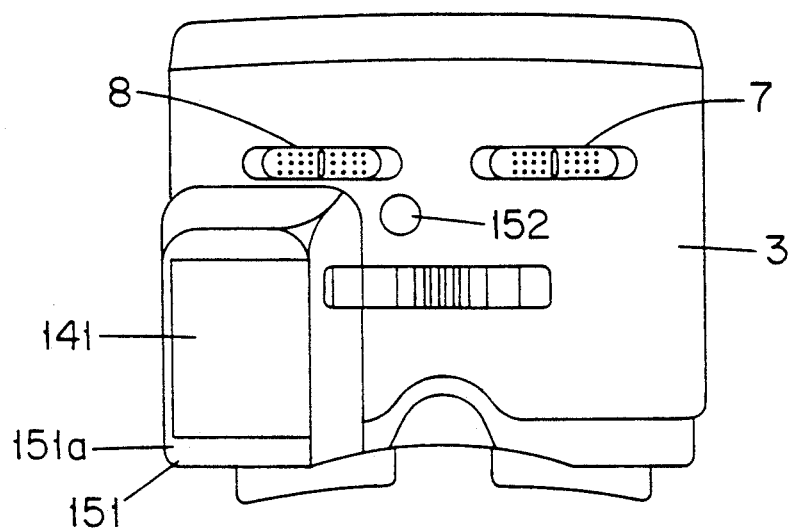
Figure 19C:
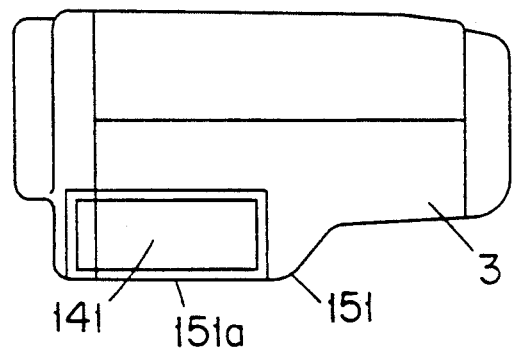

The battery holder of the binocular 1 is now described referring to FIGS. 19A-19C. FIGS. 19A and 19B correspond to FIGS. 2 and 3 respectively with an addition of the battery holder. A cavity of the battery holder 150 is arranged at a lower part of the second barrel 12 (or at a lower part of the first barrel 11) along a direction parallel to the axis of the barrel and protected by a cover 151 of the binocular 1, which forms a grip for holding the binocular 1. The shape of the holder 150 is designed so that a human's hand can firmly hold it. A 6V-battery is used as the power source and the battery 141 is firmly held by the cover 151 when the cover 151 is properly attached to the lower cover 3. It is preferable to provide a release button 152 for releasing the cover 151 from the lower cover 3 of the binocular 1, as shown in FIG. 19B.

Generally, in a binocular having an AF function, it is required to provide a power source (dry batteries) inside its body to supply power to the electric circuit for moving and controlling object lenses, etc. For example, in the binocular disclosed as a binocular having an AF function in the above-mentioned Japanese laid-open Patent Application S56-154705, the battery cavity laterally projects from housing on one side of the ocular. Because of this structure in which the side of the body projects, the binocular has a disadvantage that it is not easy to handle and that it has an inferior operationability.

On the contrary, in the above-described structure of the embodiment of the present invention, the housing of the binocular projects downward and the width of the body is not increased. Therefore, a compact binocular is realized. Further, the projecting battery cavity of the housing works as a grip for holding the binocular. Moreover, since the grip is positioned below one of the optical systems, it is supported by a palm when the binocular is held. Also, the battery cavity does not destroy the balance of the internal mechanism for automatic focusing.

Obviously, many modifications and variations of the present invention are possible in light of the above teachings. It is therefore to be understood that within the scope of the appended claims, the invention may be practiced other than as specifically described.

What is claimed is:

1. A binocular comprising:
    a pair of first and second optical systems positioned on each side of a central line, each optical system including an objective lens and an ocular arranged at a front part and at a rear part of said optical system, respectively;
    a light admitting window placed on the central line between said first and second optical systems for admitting light from an object; and
    a detection module for outputting an electric signal which corresponds to the distance to the object on the basis of the light which passes through said light admitting window.

2. A binocular according to claim 1, wherein said detection module comprises a front lens for forming an object image at a predetermined position; a condenser lens arranged adjacent to said predetermined position; an image re-forming lens arranged on the image side of said condenser lens, by which the object image formed by said front lens is divided into a pair of images and re-formed; and a line sensor for sensing the re-formed pair of images.

3. A binocular according to claim 2, wherein said detection module further comprises an optical path reflecting member arranged between said front lens and said condenser lens for converging the light from said front lens to said condenser lens.

4. A binocular comprising:
    a pair of first and second optical systems, each optical system including an objective lens and an ocular arranged at a front part and at a rear part of said optical system, respectively;
    a detection module provided independently of said first and second optical systems for receiving light from an object and outputting an electrical signal which corresponds to the distance to the object; and
    wherein said detection module includes an optical path deflecting means for z-shapedly deflecting the light to a detection sensor.

5. A binocular according to claim 4, wherein said optical path deflecting means comprises a first deflecting member for obliquely reflecting the light from the object toward the object and a second deflecting member for re-reflecting the deflected light toward the detection sensor.

6. A binocular according to claim 5, wherein said optical path deflecting means further comprises a third deflecting member for reflecting the light deflected rearwardly by said second deflecting member in a perpendicular direction, where said detection sensor is arranged to receive light from said third deflecting member.

7. A binocular according to claim 5, wherein said first deflecting member reflects light toward an upper front of said detection module, the front of said detection module facing the object.

8. A binocular according to claim 5, wherein said first deflecting member reflects light toward a lower front of said detection module, the front of said detection module facing the object.

9. A binocular according to claim 4, wherein said detection module comprises: a front lens for forming an object image at a predetermined position; a condenser lens arranged adjacent to said predetermined position;

an image re-forming lens arranged on the image side of said condenser lens, by which the object image formed by said front lens is divided into a pair of images and re-formed; and said detection sensor detects the pair of re-formed images.

10. A binocular according to claim 4 wherein said detection module is shorter than said first and second optical systems.

11. A binocular comprising:
a pair of first and second optical systems having lens elements including an objective lens and an ocular arranged at a front part and at a rear part of the optical systems, respectively;
a detection module provided independently of said first and second optical systems for z-shapedly deflecting light from an object to a detection sensor and generating an electric signal which corresponds to the distance to the object;
a position calculation means for calculating the position of the lens elements along an optical axis of said optical systems where said first and second optical systems are in focus on said object according to said electric signal; and
a driving means for driving said first and second optical system to said position.

12. A binocular comprising:
a pair of first and second optical systems, each optical system including an objective lens arranged at a front part of said optical system which is movable backward and forward and an ocular arranged at a rear part of said optical system, respectively;
a detection module provided between said first and second optical systems and for generating an electric signal which corresponds to a distance to an object according to light from the object;
a calculation means for outputting lens driving data calculated according to an electrical signal produced by said detection module;
a motor arranged on the rear side of said detection module for producing a driving force to drive said objective lens according to the driving data output by said calculation means; and
a speed reduction transmitting mechanism arranged between said detection module and said motor and for transmitting the driving force from said motor to said objective lens.

13. A binocular according to claim 12, wherein the driving shaft of said motor is parallel to the optical axis of said objective lens.

14. A binocular according to claim 13, wherein said speed reduction mechanism comprises a plurality of reduction gears, and each shaft of the gears is parallel to the optical axis of said objective lens.

15. A binocular according to claim 14, wherein said speed reduction mechanism comprises an output gear shaft extending parallel with the optical axis, the output gear shape having a cam groove for engaging a pin of a lens driving lever connected with said objective lens.

16. A binocular comprising:
a pair of optical systems including a first and second optical systems both of which are moveable;
a detection means for detecting information corresponding to a distance to an object;
a calculation means for generating an electric signal to drive said optical systems to a focusing position according an output from said detection means;
a motor driven by the electric signal of said calculation means;
a driving force transmitting means for transmitting from said motor to said optical system, a driving force for moving said optical systems in one direction and in an opposite direction thereof, the driving force transmitting means including mechanical junctions communicating the driving force from said motor to said optical systems; and
a clearance elimination means for providing a second force against said driving force transmitting means so as to eliminate any clearances in the mechanical junctions, said clearance being required for transmitting said driving force for moving said optical systems in the one direction and in the opposite direction thereof.

17. A binocular according to claim 16, wherein said clearance elimination means includes an urging means provided in a barrel where said optical systems are movably housed, for urging said optical systems in one direction against said barrel.

18. A binocular according to claim 17, wherein the first and second optical systems are urged in a same direction by the urging means provided in said barrel.

19. A binocular according to claim 17, wherein the urging means of said clearance elimination means is a spring.

20. A binocular capable of adjusting dioptric power, comprising:
a pair of optical systems including a first and second optical systems both of which are movable;
a force transmitting means for transmitting a first force to respectively move said first and second optical systems for a dioptric power adjusting operation, said first force is for moving said optical systems in one direction and in an opposite direction thereof, and said force transmitting means including mechanical junctions communicating the first force to said optical systems; and
a clearance elimination means for providing a second force against said force transmitting means so as to eliminate any clearances in the mechanical junctions, said clearances being required for transmitting said first force for moving said optical systems in the one direction and in the opposite direction thereof.

21. A binocular according to claim 20 further comprising first and second manually operable members for each dioptric power adjusting operation of said first and second optical systems wherein said force transmitting means transmits the first force generated in accordance to each operation of said first and second manually operable members to said optical systems.

22. A binocular comprising:
a pair of optical systems including a first and second optical systems both of which are movable;
a housing containing said optical systems, said housing including a single grip projection protruding downwardly from a lower part of said housing; and
an auto-focussing switch for controlling an auto-focussing mechanism which drives said first and second optical systems, said auto-focussing switch being positioned on the upper part of said housing substantially above the single grip projection to allow a viewer to control said binocular using only one hand.

23. A binocular according to claim 22 wherein said optical systems are placed side by side within said housing, said optical systems having an optical axis extending from an object to the viewer, the single grip projection protruding below one of the optical systems and extending substantially parallel to the optical axis.

24. A binocular according to claim 22 further comprising a pupil distance adjusting mechanism for varying a distance between an ocular of each optical system and a manually operable member for controlling said pupil distance adjusting mechanism positioned on the lower part of said housing.

25. A binocular according to claim 22 further comprising a dioptric power adjusting mechanism for driving an ocular of each optical system and a manually operable member for controlling said dioptric power adjusting mechanism positioned on the lower part of said housing.

26. A binocular according to claim 22, wherein said housing is balanced to sit within a single hand of the viewer.

27. A binocular comprising:

a pair of optical systems including a first and second optical systems;
a housing containing said optical systems, said housing including a single grip projection protruding downwardly from a lower part of said housing; and
a cavity for holding a battery, said cavity being surrounded by the single grip projection.

28. A binocular according to claim 27, wherein said housing is balanced to sit within a single hand of the viewer.

29. A distance detection mechanism for a binocular having a pair of optical systems, said detection mechanism comprising a light admitting window placed on a center line between the optical systems, the light admitting window transmitting light from an object to a detection module to generate a signal corresponding to a distance to the object.

* * * * *